US012665946B2

(12) United States Patent
Parsaei Fard et al.

(10) Patent No.: US 12,665,946 B2
(45) Date of Patent: Jun. 23, 2026

(54) SYSTEMS AND METHODS FOR SEMANTIC COMMUNICATION FOR CYBER SECURITY

(71) Applicant: Apple Inc., Cupertino, CA (US)

(72) Inventors: Saeideh Parsaei Fard, Cupertino, CA (US); Matthias Sauer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 18/893,391

(22) Filed: Sep. 23, 2024

(65) Prior Publication Data

US 2026/0095771 A1 Apr. 2, 2026

Related U.S. Application Data

(60) Provisional application No. 63/541,915, filed on Oct. 2, 2023, provisional application No. 63/541,650, filed on Sep. 29, 2023, provisional application No. 63/541,697, filed on Sep. 29, 2023.

(51) Int. Cl.
*H04W 12/122* (2021.01)

(52) U.S. Cl.
CPC ................................. *H04W 12/122* (2021.01)

(58) Field of Classification Search
USPC ......................................................... 726/23
See application file for complete search history.

(56) References Cited

U.S. PATENT DOCUMENTS

| | | | |
|---|---|---|---|
| 9,064,210 B1 | 6/2015 | Hart | |
| 10,360,402 B2 * | 7/2019 | Farkash | H04L 9/0643 |
| 10,657,434 B2 * | 5/2020 | Seow | G06N 3/0895 |
| 11,514,293 B2 | 11/2022 | Villegas et al. | |
| 11,563,767 B1 | 1/2023 | Rodriguez | |
| 11,654,934 B2 | 5/2023 | Huang et al. | |
| 11,757,914 B1 * | 9/2023 | Jakobsson | H04L 51/42 726/25 |

(Continued)

FOREIGN PATENT DOCUMENTS

| | | |
|---|---|---|
| CN | 112800247 B | 6/2021 |
| CN | 114091673 A | 2/2022 |

(Continued)

OTHER PUBLICATIONS

[No Author Listed], "Expanded 6G vision, use cases and societal values," D1.2, Hexa-X, 5G PPP, Apr. 30, 2021, 127 pages.

(Continued)

*Primary Examiner* — Badri Narayanan Champakesan
*Assistant Examiner* — Badri Champakesan
(74) *Attorney, Agent, or Firm* — Fish & Richardson P.C.

(57) ABSTRACT

Disclosed are methods, systems, and computer-readable medium to perform operations including: receiving coded data comprising a plurality of data elements, each data element comprising a coded message; determining, for a coded message and based on a semantic model, a semantic distortion value, the semantic model comprising one or more classifiers configured to identify a desired meaning of a given coded message based on a context of the given coded message; determining a difference between the semantic distortion value and a baseline semantic distortion value; and generating, when the difference exceeds a threshold value, a security message indicating a potential security issue.

20 Claims, 14 Drawing Sheets

100

(56)                References Cited

U.S. PATENT DOCUMENTS

| | | | |
|---|---|---|---|
| 12,518,107 B2* | 1/2026 | Tunstall-Pedoe ... | G06F 16/3329 |
| 2005/0182765 A1 | 8/2005 | Liddy | |
| 2014/0283052 A1* | 9/2014 | Jordan .................. | G06F 21/552 |
| | | | 726/23 |
| 2015/0341379 A1* | 11/2015 | Lefebvre ................ | H04L 43/04 |
| | | | 726/22 |
| 2020/0026283 A1 | 1/2020 | Barnes et al. | |
| 2020/0241546 A1 | 7/2020 | Sun et al. | |
| 2021/0288852 A1 | 9/2021 | Jia et al. | |
| 2021/0374352 A1* | 12/2021 | Li .......................... | G06N 20/00 |
| 2022/0224442 A1 | 7/2022 | Srivastava et al. | |
| 2022/0311781 A1* | 9/2022 | Maeda .................. | H04L 63/126 |
| 2023/0034450 A1 | 2/2023 | Sridhar et al. | |
| 2023/0186120 A1* | 6/2023 | Zhao ...................... | G06N 5/022 |
| | | | 706/45 |
| 2023/0198663 A1 | 6/2023 | Stocia et al. | |
| 2023/0199746 A1 | 6/2023 | Vannithamby et al. | |
| 2023/0219561 A1 | 7/2023 | El-Shaer et al. | |
| 2024/0095346 A1* | 3/2024 | Cocea .................... | G06F 21/552 |
| 2024/0146734 A1* | 5/2024 | Southgate ........... | G06F 21/6227 |
| 2025/0111249 A1 | 4/2025 | Parsaei Fard et al. | |
| 2025/0112967 A1 | 4/2025 | Parsaei Fard et al. | |

FOREIGN PATENT DOCUMENTS

| | | | |
|---|---|---|---|
| CN | 114091673 B | 4/2022 | |
| CN | 114885370 A | 8/2022 | |
| CN | 115292726 A | 11/2022 | |
| CN | 115470799 A | 12/2022 | |
| CN | 115567877 A | 1/2023 | |
| CN | 116055512 A | 5/2023 | |
| CN | 116073889 A | 5/2023 | |
| EP | 3257244 B1 | 7/2022 | |
| WO | WO 2023/054777 A1 | 4/2023 | |
| WO | WO 2023/068398 A1 | 4/2023 | |
| WO | WO 2023/095932 A1 | 6/2023 | |
| WO | WO 2023/113302 A1 | 6/2023 | |
| WO | WO 2024/035531 A1 | 2/2024 | |

OTHER PUBLICATIONS

Basu et al., "Preserving quality of information by using semantic relationships," 2012 IEEE International Conference on Pervasive Computing and Communications Workshops, Mar. 19-23, 2012, pp. 58-63.

Bosch GmbH, "Discussion on channel access mechanism for sidelink on unlicensed spectrum," 3GPP TSG RAN WG1 #109-e, R1-2204868, E-Meeting, May 9-20, 2022, 7 pages.

Broadcom Corporation, "Further Discussion on LAA DL Multi-channel LBT," 3GPP TSG-RAN WG1 Meeting #83, R1-157009, Anaheim, CA, USA, Nov. 15-22, 2015, # pages.

Cai et al., "Compute- and Data-Intensive Networks: The Key to the Metaverse," CoRR, Submitted on May 10, 2022, arXiv:2204.02001v2, 8 pages.

Choquette-Choo et al., "Label-Only Membership Inference Attacks," International Conference on Machine Learning, 2021, 139:1964-1974.

Cleverhans.io [online], "Privacy and machine learning: two unexpected allies?" Apr. 29, 2018, retrieved on Sep. 26, 2024, retrieved on <http://www.cleverhans.io/privacy/2018/04/29/privacy-and-machine-learning.html>, 12 pages.

Cnet.com [online], "When video-game glitches attack," Dec. 18, 2012, retrieved on Sep. 26, 2024, retrieved from URL<https://www.cnet.com/tech/gaming/when-video-game-glitches-attack/>, 14 pages.

Dasgupta et al., "Machine learning in cybersecurity: a comprehensive survey," The Journal of Defense Modeling and Simulation: Applications, Methodology, Technology, Sep. 19, 2020, 19(1):57-106.

De Cristofaro, "A Critical Overview of Privacy in Machine Learning," IEEE Security & Privacy, May 18, 2021, 19(4):1-8.

Fredrikson et al. "Model Inversion Attacks that Exploit Confidence Information and Basic Countermeasures," Conference on Computer and Communications Security, Oct. 12, 2015, 12 pages.

Goodfellow et al. "Explaining and Harnessing Adversarial Examples," CoRR, Submitted on Mar. 20, 2015, arXiv:1412.6572v3, 11 pages.

Gu et al. "BadNets: Identifying Vulnerabilities in the Machine Learning Model Supply Chain," CoRR, Submitted on Mar. 11, 2019, arXiv:1708.06733v2, 13 pages.

Tensorflow.org [online], "Federated Learning for Image Classification," upon information and belief, available no later than Mar. 7, 2019, retrieved on Oct. 15, 2024, retrieved from URL <https://www.tensorflow.org/federated/tutorials/federated_learning_for_image_classification>, 24 pages.

Huang et al. "Adversarial Machine Learning," Proceedings of 4th ACM Workshop on Artificial Intelligence and Security, Oct. 2011, pp. 43-58.

Kairouz et al., "Advances and Open Problems in Federated Learning," CoRR, submitted on Mar. 9, 2021, arXiv:1912.04977v3, 121 pages.

Kwon et al., "A survey of deep learning-based network anomaly detection," Cluster Computing, Sep. 27, 2017, 22(1):949-961.

Lan et al., "What is Semantic Communication? A View on Conveying Meaning in the Era of Machine Intelligence," CoRR, Submitted on Oct. 1, 2021, arXiv:2110.00196v1, 40 pages.

Letaie et al., "Edge Artificial Intelligence for 6G: Vision, Enabling Technologies, and Applications," CoRR, Submitted on Nov. 24, 2021, arXiv:2111.12444v1, 33 pages.

Li et al., "Multi-Carrier LAA with Adaptive Energy Detection and Carrier Selection," 2019 IEEE 90th Vehicular Technology Conference (VTC2019-Fall), Honolulu, HI, USA, Sep. 22-25, 2019, 5 pages.

Liu et al., "Privacy and Security Issues in Deep Learning: A Survey," IEEE, Dec. 15, 2020, pp. 4566-4593.

Liu et al., "When Machine Learning Meets Privacy: A Survey and Outlook," CoRR, Submitted on Nov. 24, 2020, arXiv:2011.11819v1, 35 pages.

Lyer et al., "A Survey on Semantic Communications for Intelligent Wireless Networks," CoRR, Submitted on Aug. 10, 2022, arXiv:2202.03705v2, 30 pages.

Mireshghallah et al., "Privacy in Deep Learning: A Survey," CoRR, Submitted Apr. 25, 2010, arXiv:2004.12254v1, 18 pages.

Nokia et al., "On Physical Channel Design Framework for SL-U," 3GPP TSG RAN WG1 #109-e, R1-2203123, e-Meeting, May 9-20, 2022, 9 pages.

Papernot et al., "SoK: Security and Privacy in Machine Learning," 2018 IEEE European Symposium on Security and Privacy, Apr. 24-26, 2018, 399-414.

Papernot "A Marauder's Map of Security and Privacy in Machine Learning: An overview of current and future research directions for making machine learning secure and private," CoRR, Submitted Nov. 3, 2018, arXiv:1811.01134v1, 20 pages.

Shao et al., "Task-Oriented Communication for Multi-Device Cooperative Edge Inference," CoRR, Submitted on Sep. 12, 2023, arXiv:2109.00172v3, 15 pages.

Sheatsley et al., "Adversarial Examples for Network Intrusion Detection Systems," CoRR, Submitted Sep. 9, 2022, arXiv:2011.01183v3, 15 pages.

Strinati et al., "6G networks: Beyond Shannon towards semantic and goal-oriented communications," CoRR, Submitted on Feb. 17, 2021, 52 pages.

Tong et al., "A Survey on Intrusion Detection System for Advanced Metering Infrastructure," Sixth International Conference on Instrumentation & Measurement, Computer, Communication and Control (IMCCC), Jul. 2016, pp. 33-37.

Tramer et al. "Stealing Machine Learning Models via Prediction APIs," CoRR, Submitted on Oct. 2, 2016, arXiv:1609.02943v2, 19 pages.

Wang et al., "Cooperative Car-Following Control: Distributed Algorithm and Impact on Moving Jam Features," IEEE Transactions on Intelligent Transportation Systems, May 2016, 17(5):1459-1471.

(56) References Cited

OTHER PUBLICATIONS

Yun et al., "Attention-based Reinforcement Learning for Real-Time UAV Semantic Communication," CoRR, Submitted on May 22, 2021, arXiv:2105.10716v1, 6 pages.

* cited by examiner

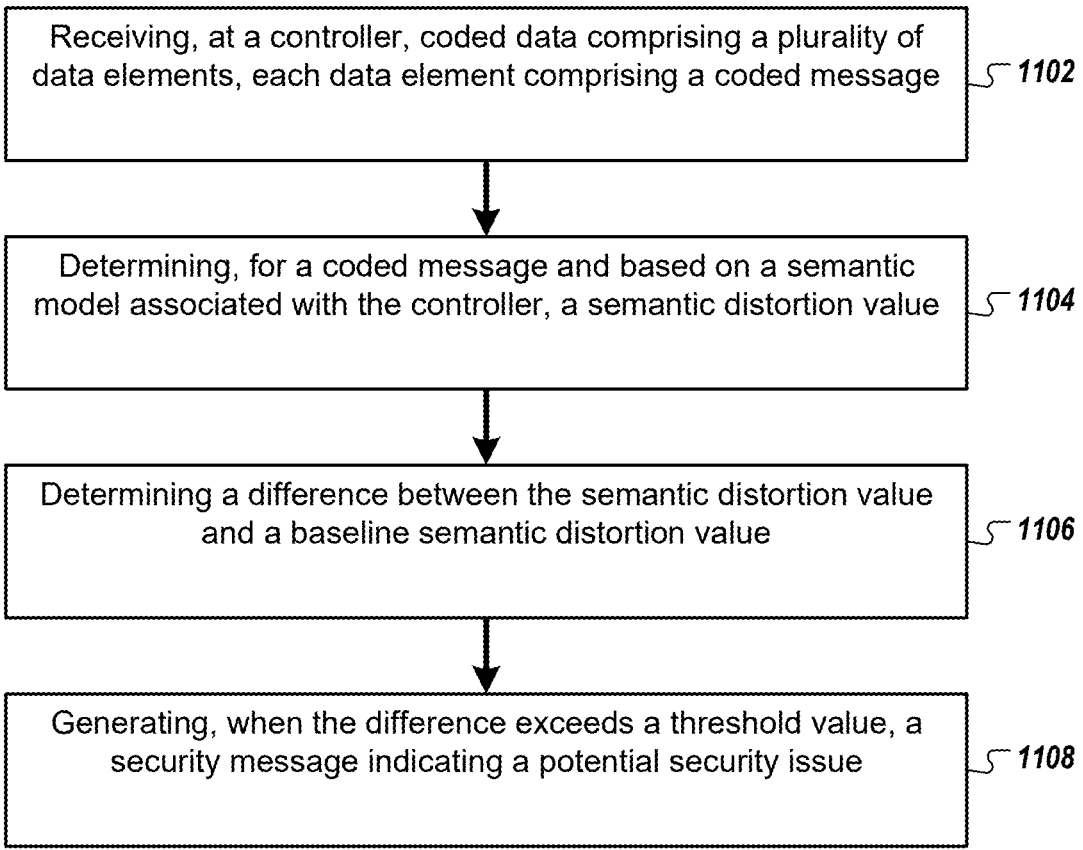

1100

Receiving, at a controller, coded data comprising a plurality of data elements, each data element comprising a coded message ⌐1102

Determining, for a coded message and based on a semantic model associated with the controller, a semantic distortion value ⌐1104

Determining a difference between the semantic distortion value and a baseline semantic distortion value ⌐1106

Generating, when the difference exceeds a threshold value, a security message indicating a potential security issue ⌐1108

FIG. 11

1200

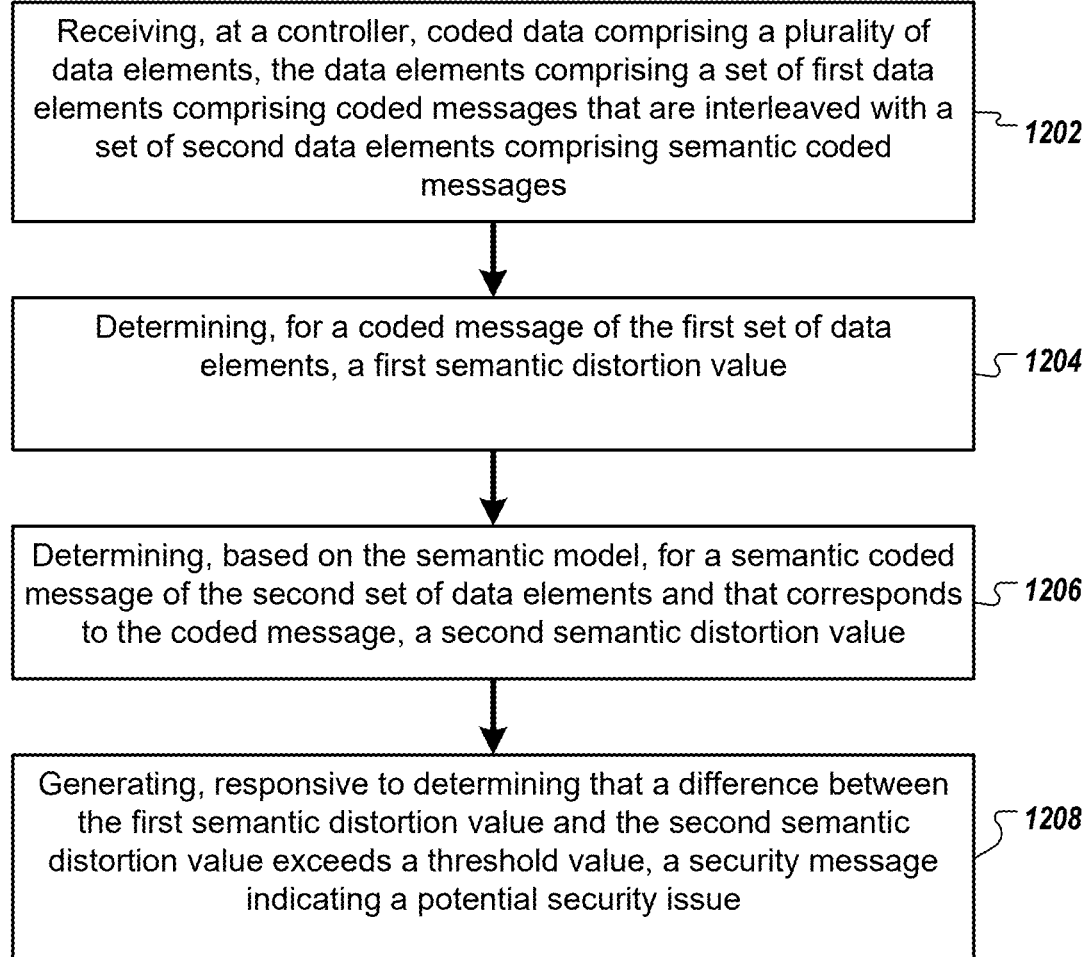

Receiving, at a controller, coded data comprising a plurality of data elements, the data elements comprising a set of first data elements comprising coded messages that are interleaved with a set of second data elements comprising semantic coded messages — 1202

Determining, for a coded message of the first set of data elements, a first semantic distortion value — 1204

Determining, based on the semantic model, for a semantic coded message of the second set of data elements and that corresponds to the coded message, a second semantic distortion value — 1206

Generating, responsive to determining that a difference between the first semantic distortion value and the second semantic distortion value exceeds a threshold value, a security message indicating a potential security issue — 1208

SYSTEMS AND METHODS FOR SEMANTIC COMMUNICATION FOR CYBER SECURITY

CLAIM OF PRIORITY

This application claims priority under 35 U.S.C. § 119(e) to U.S. Patent Application Ser. No. 63/541,650, filed on Sep. 29, 2023, U.S. Patent Application Ser. No. 63/541,697, filed on Sep. 29, 2023, and U.S. Patent Application Ser. No. 63/541,915, filed on Oct. 2, 2023, the entire contents of each of which are hereby incorporated by reference.

BACKGROUND

Wireless communication networks provide integrated communication platforms and telecommunication services to wireless user devices. Example telecommunication services include telephony, data (e.g., voice, audio, and/or video data), messaging, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

Traditional wireless communications focus on improving the accuracy of symbol transmissions. For example, a transmitter (TX) device, such as a TX user equipment (UE), encodes information into a stream of symbols according to a predefined protocol and transmits the encoded symbols via one or more wireless channels. Correspondingly, a receiver (RX) device, such as an RX UE, receives the stream of symbols and decodes the symbols to recover the transmitted information. Because the transmission is typically susceptible to noise and interference, the information symbols are often transmitted with redundant symbols for error checking and/or correction.

SUMMARY

The device or system that is performing semantic decoding can analyze a semantic trend of a given data stream. For example, the data processing system that is performing semantic decoding can measure a semantic distortion trend and estimate an expected semantic distortion trend. The device measures a difference between these two trends to determine if there an issue for decoding the semantic data, where the issue represents a potential security risk that has compromised one of the semantic models.

For semantic communication, there are one or more machine learning models that are trained to perform semantic decoding of the communication. Attackers can use a small, unimportant part of training data to change the outcome of the trained models. In some implementations, incorrect training data can be inserted into the larger set of training data, or various landmarks can be subtly changed to introduce errors into the machine learning process. Because classification is not precise, there can be unexpected behavior of a given use case. Specifically, a malicious user can poison weights of a given model or poison local knowledge base (KB) data associated with a semantic decoder of the device.

The poisoning attacks can disrupt various applications. For example, a fiducial marker can incorrectly be associated with a target device as being a feature that identifies the target device. An additional marker can be introduced into another context (e.g., on another object) to mislead the machine learning model to classify another object as the target device. There will be a new version of the attack, which has an impact on the experience of the end users in the next generation of new applications in $6^{th}$ generation communication systems (e.g., 6G). While semantic communication can be considered a promising approach to improve communication efficiency, it can be an avenue for cyber-attacks on 6G systems.

The system can use semantic coding at control plane to detect the attacks for the traditional data plane. UE can, but need not, be capable of semantic coding. If the UE is not capable of semantic encoding, the network performs the operations described herein in a centralized manner. If the UE is capable of semantic coding, the UE can track semantic distortion in a distributed manner in the network. In this case, the UE can detect a victim device. When the device is using semantic/task-oriented communication, an attack can involve poisoning the models, poisoning the inputs of the models and poisoning the local KBs. In this case, the data that is monitored is under attack, so a semantic distortion indicator (SDI) can also be misleading. The system uses known, reliable data as pure reference.

To provide the reliable data and solve this challenge, the device or system can mix original and semantic frames to give these pure reference data for detecting cyber-attacks of semantic communication. Then, the system tracks SDI from both semantic and traditional frames. If the SDI derived from semantic coding is different from the SDI which is derived from the original data in the control plane, then there is an attack in the system. Therefore, while we are using SDI from data plane, the system has the original data as a backup to recheck the SDI of the actual data and transmitted data. This approach again can be done in distributed or centralized manner.

The system uses red flags as a way to check whether an attack has occurred or is occurring. Red flags include features machine learning or artificial intelligence models for semantic coding. The features are not part of the data. The system uses the red flags check the inaccurate classification for the semantic coding that is under attack.

One or more operations of the above methods can be performed by one or more processors of an apparatus, such as a Semantic Measurement and Control Entity (SMCE). In accordance with one aspect of the present disclosure, a method is provided. The method includes transmitting, by a first UE and to a semantic control apparatus, semantic data corresponding to a semantic communications session between the first UE and a second UE. The method includes synchronizing the semantic data with the semantic control apparatus. Examples of the embodiments are described herein and are subsequently further enumerated in an examples section.

The details of one or more implementations of these systems and methods are set forth in the accompanying drawings and the description below. Other features, objects, and advantages of these systems and methods will be apparent from the description and drawings, and from the claims.

BRIEF DESCRIPTION OF THE FIGURES

FIG. 11 illustrates a flowchart of an example method.

FIG. 12 illustrates a flowchart of an example method.

DETAILED DESCRIPTION

Figure 1:
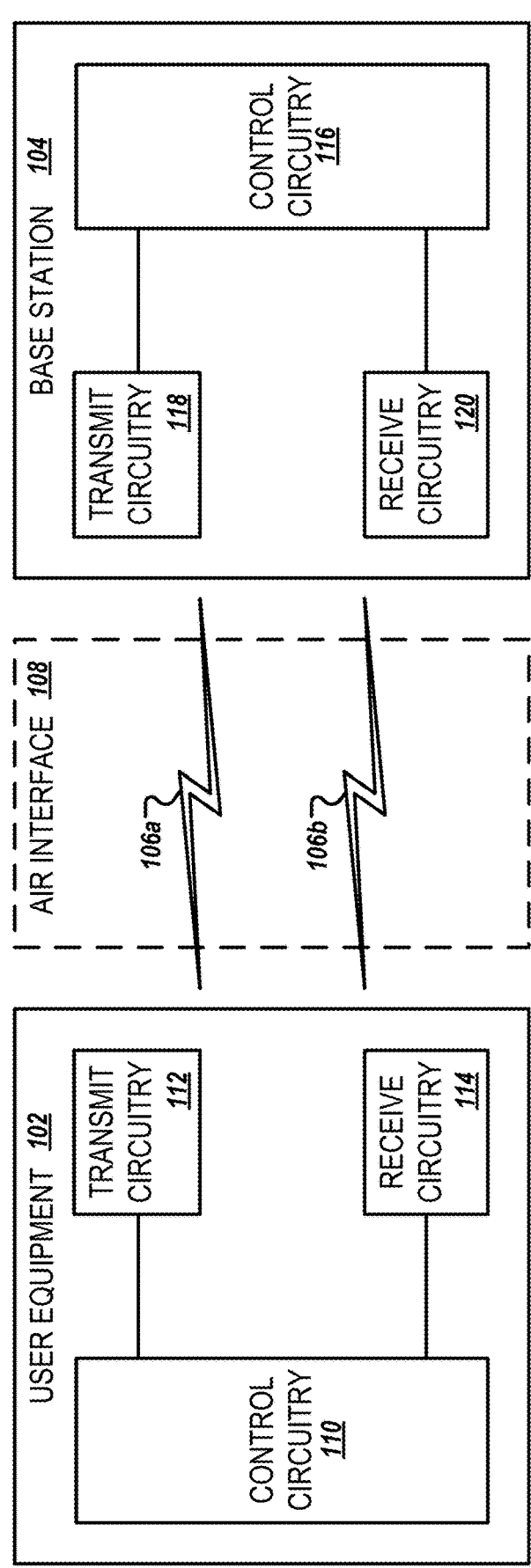
FIG. 1 illustrates an example of a wireless network, according to some implementations.

In traditional wireless communications, communication quality is typically measured based on the number of symbols recoverable/recovered by the receiving device. For a given set of encoded symbols, increasing the number of symbols recoverable/recovered at the receiving device means transmitting more redundant symbols for error checking and/or correction. This can increase the consumption of network resources and the complexity of devices.

In contrast to traditional wireless communications, semantic communications focus on conveying the desired meaning ("perception" or "context") in the transmitted symbols. A traditional wireless receiver attempts to recover information objectively encoded in each individual symbol, whereas a semantic wireless receiver attempts to infer the subjective perception that the transmitter device intends to convey. For example, when a transmitting device wants to convey weather information to a receiving device, instead of transmitting the exact temperature value, the transmitting device can perceive that the weather is cold, warm, or hot, and transmit its perception of the weather to the receiving device in semantic messages. Correspondingly, the receiving device can interpret the weather condition based on the semantic information received from the transmitting device. A communications session for transmitting and receiving semantic messages can be referred to as a semantic communications session. The interpretation by the transmitting device can be referred to as semantic encoding, while the interpretation by the receiving device can be referred to as semantic decoding. When the transmitting device and the receiving device interpret the same semantic information differently, semantic distortion can occur.

In the above example of weather reporting, the semantic encoding and decoding of the weather condition rely on semantic knowledge of the transmitting device and the receiving device, respectively. The semantic knowledge can be stored in one or more storage devices, referred to as knowledge bases (KBs), in the form of, e.g., data indicating a correspondence between a temperature value and a weather condition. To ensure that the receiving device interprets the semantic information as intended by the transmitting device, the transmitting device and the receiving device may have their respective semantic knowledge synchronized. Otherwise, for a given temperature value (e.g., 15° C.) transmitted, if the weather condition interpreted by the transmitting device (e.g., warm) is different from that interpreted by the receiving device (e.g., cold), then the semantic communications session can be considered to suffer a semantic distortion that negatively affects the communication quality.

A wireless communication system is configured to send and receive semantic data. In general, semantic data represents a desired meaning of a given coded message based on a context of the given coded message for that transmission. The semantic meaning is determined based on semantic models that are trained for the device performing the communication, the device receiving the communication, the type of data being communicated, and so forth.

Further, in some implementations, a wireless communication system can generate semantic data for specific types of use cases. For example, a wireless communication system can generate semantic data specifically to represent video content, audio content, and/or text content. As another example, a wireless communication system can generate semantic data specifically to represent data pertaining to the operation of an autonomous vehicle (e.g., sensor data, telemetry data, trajectory data, etc.). In particular, a wireless communications system can determine the degree of semantic distortion in these contexts by generating noisy semantic data (e.g., using an "augmentation generator" or "augmentation generator circuitry") and decoding the semantic data using a noisy decoder (e.g., using a "semantic decoder mirror," "semantic decoder mirror circuitry," or "semantic mirror circuitry"). This can be advantageous, for example, in allowing systems to test the robustness of the semantic encoding and decoding operations in a wide array of contexts specific to those use cases.

A Distributed Semantic Measurement and Control Entity (D-SMCE) can be configured to monitor the communications between two systems and determine a degree of semantic distortion of those communications (also referred to as semantic distortion index, SDI), and to perform operations to mitigate semantic distortion (e.g., by causing one or more systems to modify the knowledge base(s) used for semantic communication to better conform with the other system(s)).

A semantic distortion can refer to the deviation between (i) the transmitting system's desired meaning of a given coded message, and (ii) the receiving system's interpretation of the coded message.

A knowledge base (KB) can include a semantic model that represents the context of the source data, the manner in which the source data is collected or generated, the manner in which the source data is to be transmitted, the manner in which the source data will be used, and/or any information relating to the nature of the source data.

A local knowledge base (L-KB) is locally stored by that device and used for semantically encoding and/or decoding data by that device. A L-KB 300 can include two parts, a public/non-sensitive part and a private/sensitive part. In general, the public/non-sensitive part does not include any sensitive or private information by a user and can be shared with others. The private/sensitive part includes information that a user deems to be sensitive or private information and is not shared with others.

The disclosed security aspects herein are applicable to both centralized and distributed SMCE, which are described in greater detail in U.S. provisional application Nos. 63/541,650 and 63/541,697 which are each incorporated by reference in their entireties.

For semantic communication, there are one or more machine learning models that are trained to perform semantic decoding of the communication. Attackers can use a small, unimportant part of training data to change the outcome of the trained models. In some implementations, incorrect training data can be inserted into the larger set of training data, or various landmarks can be subtly changed to introduce errors into the machine learning process. Because classification is not precise, there can be unexpected behavior of a given use case. Specifically, a malicious user can poison weights of a given model or poison local KB data associated with a semantic decoder of the device.

The poisoning attacks can disrupt various applications such as autonomous driving and vehicle platooning. For example, a user can place a fiducial marker on a stop sign. The fiducial marker can incorrectly be associated with the stop sign as being a feature that identifies the stop sign. An additional marker can be introduced into another context (e.g., on another object) to mislead the machine learning model to classify another object as a stop sign. There will be a new version of the attack, which has an impact on the experience of the end users in the next generation of new applications in next generation communication systems (e.g., 6G). While semantic communication can be considered a promising approach to improve communication efficiency, it can be an avenue for cyber-attacks.

To address this challenge, a control plane mechanism is included to improve robustness of semantic decoding and assists a data processing system to recognize these attacks on the machine learning models that support semantic communication. For example, the control plane can take advantage of a temporal context of the semantic communication, a spatial context of the semantic communication, or other environmental context of the semantic communication to attain diversity in the output of the models and even for the training of models for semantic communication. This approach can reduce a risk of poisoning of the machine learning models that support the semantic communication. This approach can be used for both original space of data and semantic/feature/latent space of the data. It can be applied for the traditional transmission as well as for wireless networks.

The data processing system can measure a difference between the expected semantic communication and a measured semantic communication for a given context. This analysis can determine what is "normal" for a given context and what is "not normal" for a given context. The data processing system can train one or more models to identify red flags in the semantic data that represent a detected change in the semantic communication that departs from an expected semantic communication or an expected "real data" scenario. These trained models can be stored locally at the particular device that is using those trained models to detect a potential cyber security risk. The trained models are therefore safe from being poisoned themselves.

The device or system that is performing semantic decoding can analyze a semantic trend of a given data stream. For example, the data processing system that is performing semantic decoding can measure a semantic distortion trend and estimate an expected semantic distortion trend. The device measures a difference between these two trends to determine if there an issue for decoding the semantic data, where the issue represents a potential security risk that has compromised one of the semantic models.

The expected semantic distortion can be determined based on the particular channel being used, the context of the semantic communication, that particular encoding device, the particular decoding device, or any other context data that can be analyzed over time by multiple users to train the models that classify the semantic distortions. For example, the system can analyze a time distance among the instances of real data and follow a temporal coherency of the semantic data. Fake or poisoned data does not follow this same distance and coherency over time. The data processing system uses the difference to distinguish attacks via the semantic distortion over time. If a map is about classification, e.g., semantic segmentation, then the mapping space includes the classified segment. Then, we also can check if there is a detected object as a normal object or an outlier object. Values of parameters are trained. For a distance function in mapping space for a user, a threshold value in mapping space for normal behavior is trained. For a distance function in original space for the user, another threshold value in the original space is trained.

The data processing system (e.g., a UE) tracks the semantic distortion from the mapping space. The device can detect anomaly behaviors through the mapping space, the original apace, or a combination of both. The device acts responsive to this detection through the control elements if the threshold is passed or the anomaly is detected. The device can perform this behavior even if the data plane does not have a mapping space.

The device uses the SMCE and a semantic distortion indicator (SDI) for controlling temporal consistency of both traditional coding and semantic communication rather than for transmission or reception of the semantic communication. The SDI can be measured using centralized approaches or distributed approaches. In a first scenario, the device performs a traditional communication with semantic control plane that manages semantic attacks and temporal coherency. In a second scenario, the device performs semantic communication with both the semantic control plane and the traditional communication to keep track of coherency and poisoning attacks. The device is configured to use the following aspects of semantic communication to identify malicious attacks on the original data of the device. For a scenario involving traditional coding, the semantic control is used to detect the malicious attack on the original data. The device uses an interleaving scheme in which semantic messages are interleaved with traditional messages to identify malicious attacks on the semantic models. The device generates a semantic coherence time value that is associated with semantic data over a specific period of time. The semantic coherence time value is used to identify whether the semantic distortion is within a threshold of an expected semantic distortion or whether the semantic distortion is outside of an expected semantic distortion. The semantic trend corresponds to a period of time. The semantic coherence time value of the period of time represents a baseline for the expected semantic distortion. In another example, the device is configured to train and also use one or more models that identify red flags in the semantic communication data. These red flags correspond to scenarios in which an attack is likely present such as a sudden shift in semantic distortion values or other specific combinations of data with malicious attacks being received for a particular context. The device generates tracking messages for tracking communications overtime. The device is configured to track semantic distortions over time for detecting outliers in the semantic distortion. The tracking can be inside the device itself or outside the device depending on the capability of the device to run the machine learning models. For example, if the machine learning models are hosted on another device, then the tracking is performed outside of the device.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be an Evolved Universal Terrestrial Radio Access (E-UTRA)-NR Dual Connectivity (EN-DC) network, or an NR-EUTRA Dual Connectivity (NE-DC) network. In some other implementations, the wireless network 100 may be a Standalone (SA) network that incorporates only 5G NR. Furthermore, other types of communication standards are possible, including future 3GPP systems (e.g., Sixth Generation (6G)), Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, any of laptop computers, smartphones, tablet computers, machine-type devices such as smart meters or specialized devices for healthcare, intelligent transportation systems, or any other wireless device. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider or may be the Internet. Each base station service area associated with the base station 104 is supported by one or more antennas integrated with the base station 104. The service areas can be divided into a number of sectors associated with one or more particular antennas. Such sectors may be physically associated with one or more fixed antennas or may be assigned to a physical area with one or more tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry and/or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations, such as those described elsewhere in this disclosure related to a UE. For instance, the control circuitry 110 can be configured to encode data and/or decode data for semantic communication. As another example, the control circuitry 110 can be configured determine a degree of semantic distortion between two or more devices and perform operations to reduce the degree of semantic distortion.

The transmit circuitry 112 can perform various operations described in this specification. For example, the transmit circuitry 112 can be configured to transmit data (e.g., semantically encoded data) for semantic communication with one or more other devices. Additionally, the transmit circuitry 112 may transmit using a plurality of multiplexed uplink physical channels. The plurality of uplink physical channels may be multiplexed, e.g., according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. For instance, the receive circuitry 114 can be configured to receive data (e.g., semantically encoded data) for semantic communication with one or more other devices. Additionally, the receive circuitry 114 may receive a plurality of multiplexed downlink physical channels from the air interface 108 and relay the physical channels to the control circuitry 110. The plurality of downlink physical channels may be multiplexed, e.g., according to TDM or FDM along with carrier aggregation. The transmit circuitry 112 and the receive circuitry 114 may transmit and receive, respectively, both control data and content data (e.g., messages, images, video, etc.) structured within data blocks that are carried by the physical channels.

FIG. 1 also illustrates the base station 104. In some implementations, the base station 104 may be a 5G radio access network (RAN), a next generation RAN, a E-UTRAN, a non-terrestrial cell, or a legacy RAN, such as a UTRAN. As used herein, the term "5G RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The receive circuitry 120 may receive a plurality of uplink physical channels from one or more UEs, including the UE 102.

In FIG. 1, the one or more channels 106A, 106B are illustrated as an air interface to enable communicative coupling, and can be consistent with cellular communications protocols, such as a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any other communications protocol(s). In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Discovery Channel (PSDCH), and a Physical Sidelink Broadcast Channel (PSBCH).

Figure 2:
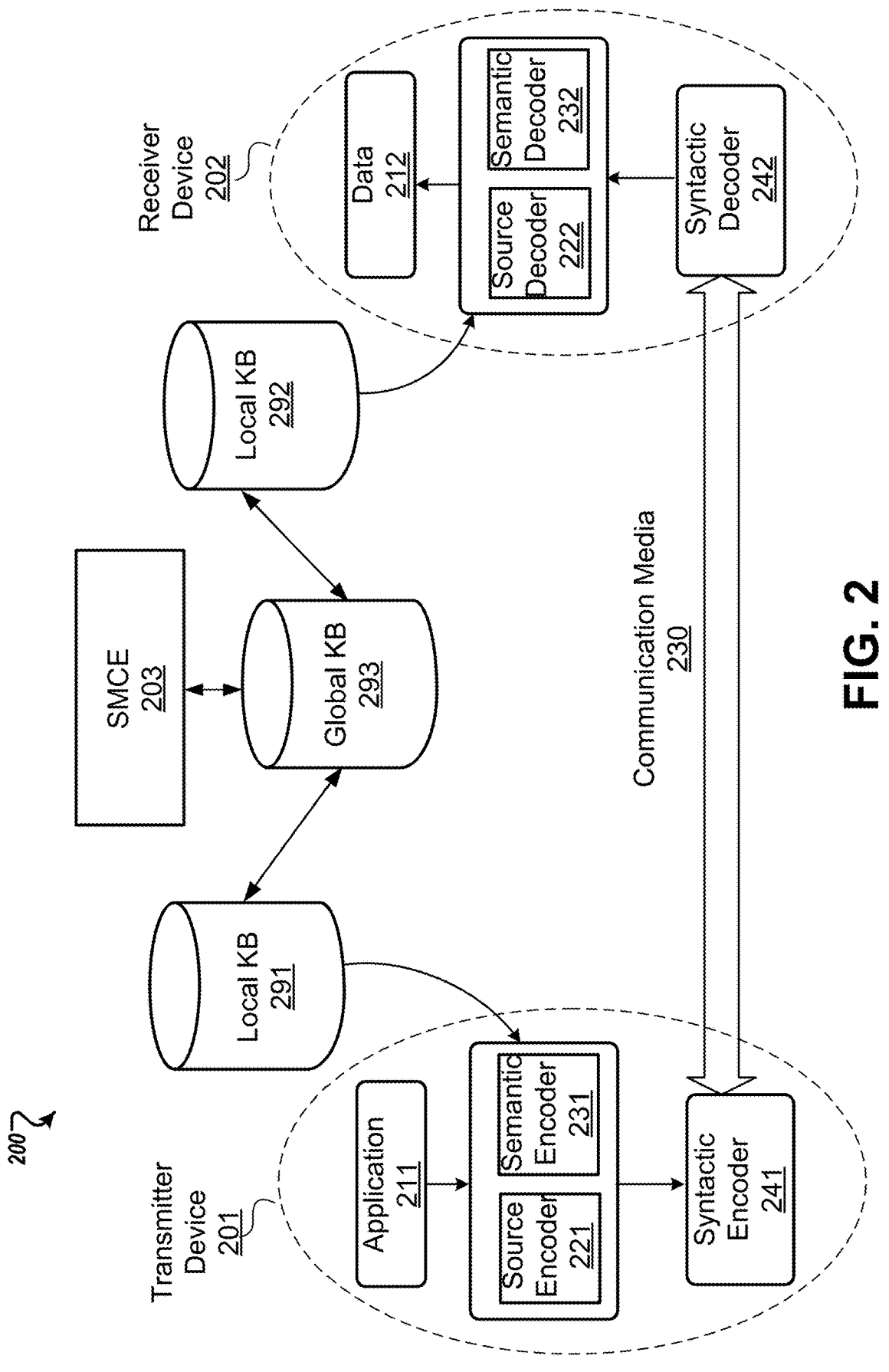
FIG. 2 illustrates an example of a semantic communications system, according to some implementations.

FIG. 2 illustrates a semantic communications system 200, according to some implementations. Semantic communications system 200 includes a transmitting (TX) device 201 (e.g., a UE for transmitting data) and a receiver (RX) device 202 (e.g., a UE for receiving data from the transmitter device 201). The transmitting device 201 and the receiving device 202 communicate through communication media 230. Communication media 230 can include protocol stacks for at least one of a network layer, a medium access control (MAC) layer, or a physical (PHY) layer. In some implementations, the transmitter device 201 and/or the receiver device 202 can be a UE 102 or a base station 104 (e.g., as described with reference to FIG. 1). Although system 200 describes devices as being a transmitter device 201 or a receiver device 202, in practice, a device can both transmit and receive data concurrently in an alternating manner.

Each of transmitting device 201 (e.g., a TX UE) and receiving device 202 (e.g., an RX UE) can have structures and functions similar to those of UE 102 of FIG. 1. In addition to source encoder 221, which can encode a message for traditional, non-semantic communications, transmitting device 201 has semantic encoder 231, which can obtain semantic information (e.g., application data to be transmitted) from application 211 and generate a semantic message, transmitting device 201 also has syntactic encoder 241, which can encode the message, traditional or semantic, according to the syntax of a communication protocol. The syntactically encoded message is then transmitted, via communication media 230, to receiving device 202. Correspondingly, receiving device 202 has syntactic decoder 242, which syntactically-decodes the message received from transmitting device 201. Depending on whether the syntactically decoded message is a traditional message or a semantic message, receiving device 202 uses source decoder 222 or semantic decoder 232 to decode the message and obtain application data 212.

Transmitting device 201 and receiving device 202 are each associated with a local KB, 291 and 292, respectively, which can be implemented on one or more storage devices that are part of the UEs or communicatively coupled (e.g., on a cloud) to the UEs. Local KBs 291 and 292 can provide information such as rules and parameters for semantic encoder 232 and semantic decoder 232 to encode and decode, respectively, semantic messages.

Semantic communications system 200 also includes SMCE 203, which can be implemented as a network entity, such as a component of a base station or other entity in the access network, which coordinates the semantic communications between transmitting device 201 and receiving device 202. SMCE 203 has global KB 293, which can be partially or fully accessible to local KBs 291 and 292 to provide semantic context for semantic communications between transmitting device 201 and receiving device 202. In general, a global KB can store semantic information accessible by not only the storing SMCE but other devices in communication with the SMCE. A local KB, on the other hand, can store information that is specific to the storing device. SMCE 203 can be configured to perform a variety of functions, such as synchronizing semantic context with local KBs 291 and 292, managing KB versions and compatibility of local KBs 291 and 292, and detecting and tracking semantic distortion. In some implementations, SMCE 203 can be virtualized with functions performed by one or more control nodes of a network or the cloud.

In some implementations, the transmitter device 201 and/or the receiver device 202 can communicate with one another via a network, such as a peer-to-peer (P2P) network, a mesh network, a clustered network, or any other type of network. Further, each of the transmitter device 201 and/or the receiver device 202 can be used or controlled by a human user, a machine (e.g., a computer system), or a combination thereof.

In general, each of the transmitter device 201 and/or the receiver device 202 has two planes, a data plane and a semantic control plane. The data plane is responsible for the transmission of source data with semantic encoding. The semantic control plane (including a SMCE control module and SMCE measurement module) is responsible handling any mismatch (e.g., a mismatch between the source data and the interpretation of the semantic encoded representation of the source data) and resolving any conflict among the devices.

Further, each device has, in parallel, "classical" data and control planes, called "syntactic encoder" and "syntactic control plane." There are two data plane pipelines for semantic and classical source coding, where the elements of the syntactic layers (e.g., MAC and L1) are adjusted in accordance with the source coding. Switching among pipelines is performed by a D-SMCE control module based on feedback/information about the communication channel. Semantic and classical pipelines are responsible to form the packets and frames to be fed to the communication system (or "syntactic encoder").

In general, the transmitter device 201 semantically encodes source data using a knowledge base to obtain a semantically encoded representation of the source data. This semantic encoded data can represent, for example, the underlying meaning of the source data, but does not necessarily include the source data in its entirety. Further, the knowledge base can include a semantic model that represents the context of the source data, the manner in which the source data is collected or generated, the manner in which the source data is to be transmitted, the manner in which the source data will be used, and/or any information relating to the nature of the source data.

Further, the receiver device 202 receives the semantically encoded data, and decodes the semantically encoded data using a knowledge base to obtain a representation of the original source data. In some implementations, the knowledge base can be the same as the knowledge based that was used by the transmitter device 201 to generate the semantically encoded data. In some implementations, the knowledge base can be different, at least some respects, from the knowledge based that was used by the transmitter device 201 to generate the semantically encoded data.

In some implementations, each of the devices can include a local knowledge base (L-KB) that is locally stored by that device and used for semantically encoding and/or decoding data by that device. For example, a L-KB can include two parts, a public/non-sensitive part and a private/sensitive part. In general, the public/non-sensitive part does not include any sensitive or private information by a user and can be shared with others. The private/sensitive part includes information that a user deems to be sensitive or private information and is not shared with others.

At the initialization phase of transmission (also referred to as the semantic synchronization phase), the two (or more) users agree on a shared knowledge (Shared KB) that includes data from the public/non-sensitive parts of the L-KB. However, the L-KBs of the devices retain their respective private/sensitive parts, and do not provide the information therein to the Shared KB.

In general, the users of the devices can exhibit different behavior during their communication. In some implementations, the users can be friendly and cooperative with one another. For example, the users can openly share all of their knowledge/data with one another. Further, if their L-KBs become outdated or noisy, the users can update their L-KBs in the negotiation and synchronization phases. In this context, there may be no need to introduce incentive mechanisms for sharing content of the L-KBs.

In some implementations, the users may be cooperative but reserved. For example, both sides can be cooperative and share their public/non-sensitive data with one another. However, they may refrain from sharing their L-KBs during a communications session. Here, the incentive mechanisms (e.g., providing a reward or reducing the cost of communication), can be useful for both sides. In some implementations, users can transition from the cooperative but reserved relationship to a friendly and cooperative relationship over time.

In some implementations, the system may be subject to a cyber/poisoned attack by one or more malicious users. For instance, the transmitter device 201 and/or the receiver device 202 may be subject to a cyberattack or poisoned attack. As an example, the Shared KB and/or the L-KBs may be attacked or poisoned. Since semantic communication inherits all attack aspects of artificial intelligence (AI) and/or machine learning (ML) algorithms, semantic communication can be a subject of any type of AI/ML attack during the training and inference phases. If the offline and training phase is not part of the session, D-SMCE may not be able to directly act. However, semantic distortion can be used to highlight the outliers attacked during the offline phase. In general, the inference attacks during the communication session are considered as adversarial attack of MLs in the inference phase (decision making).

In some implementation, the users of the transmitter device 201 and/or receiver device 202 may be malicious users. For example, the users and/or their devices may not be cooperative, and in some cases may intentionally aim to destroy the other user's perception of semantic communication. The behavior of this class of users can be seen as outliers, jammers, or eavesdroppers. If the L-KB 300 of one device is poisoned/attacked, this attack can be propagated to all other devices.

In each of these situations, it is beneficial to determine the degree of semantic of the communication between the two devices in order to mitigate issues that may arise (either due to intentional behavior and/or malicious behavior) during the communication.

In general, semantic communication may refer to different source data categories such as image, video, audio, voice, sensor data, formal language-based content, American Standard Code for Information Interchange (ASCII) text, or any other type of data. As an example, semantic communication can be used to exchange video and/or audio in a more efficient manner. For instance, a transmitter device can use semantic communication to extract and transmit the relevant information (e.g., semantics) from source data (e.g., source data representing video and/or audio), using knowledge that is available at the transmitter device. Further, the transmitter device can provide the semantics (e.g., the semantically encoded data) to the receiver device, rather than transmitting the source data itself. Upon receiving the semantics, the receiver device can reconstruct the source data by exploiting knowledge available at the receiver device (e.g., in order to semantically decode the received data).

In some implementations, switch between semantic and classical communication (e.g., (e.g., during a communication session) may require changes in the frame processing, frame period (or timing), and frame types, which collectively may be referred to as the "pipeline." In some implementations, switching can be triggered and mitigated in its transient effects by the transmitter device's D-SMCE control module based on channel state information and/or by receiver device's request.

In the example use cases described below, a device's L-KB includes the knowledge that is used for semantic communication. For example, a L-KB can include information regarding: AI/ML model types, versions, and (hyper-) parameters for extraction and reconstruction, and side information for extraction (e.g., relevance and prioritization of latent features), and reconstruction (e.g., source frame and situational context).

As described in further detail below, some part of the information in the L-KB may be public (e.g., non-private/non-sensitive) and other data may be considered private (e.g., strictly private). Thus, the shared KB can hold the public information of all devices participating in the communication session.

Further, in some implementations, inconsistencies in the Local KBs and aging of information in the Shared KBs across UEs/devices may arise, which can adversely affect the accuracy (and in some cases, cause failure) of semantic communication.

The semantic control plane can be used to detect semantic distortion caused by inconsistencies in and aging of distributed shared knowledge in Shared KBs, re-sync Shared KBs during a session, and/or perform the related measuring and controlling tasks in a fully distributed manner.

For a first scenario, traditional source coding is a major coding, and semantic coding helps network for security reasons. In this case, the device or semantic control plane in the network determines a semantic coherence time and generates a tracking parameter inside the network or inside of the control plane of device to add an extra level of understating the message to the network. The combination of these two parameters helps the semantic controller plane to keep track of changing the semantics of messages. If the semantic of messages changes faster than the nominal values of that specific application, content, or use case, the device detects a chance of cyber-attacks being present. The semantic models increase the privacy of the end-users since they will mimic the message of end-users, not their exact messages, or add extra power to SMCE to predict more situations.

In a second scenario, the semantic source coding is a major coding, and traditional coding helps networks with the security of semantic coding. Traditional coded messages are interleaved with semantic coded messages. This interleaving is controlled by the SMCE in a centralized manner or in a decentralized manner. These interleaved messages are decoded in SMCE controller modules and compared with existing coded messages. If the distance between the two coded messages is greater than the expected value, SMCE initiates the controlling procedures, including synchronization between the receiver and the transmitter. The device control plane of the device causes an under-control scenario where the SMCE asks for more frequent interleaving to realize if the message has inherent semantic distortion, or it is under-attack.

Figure 3:
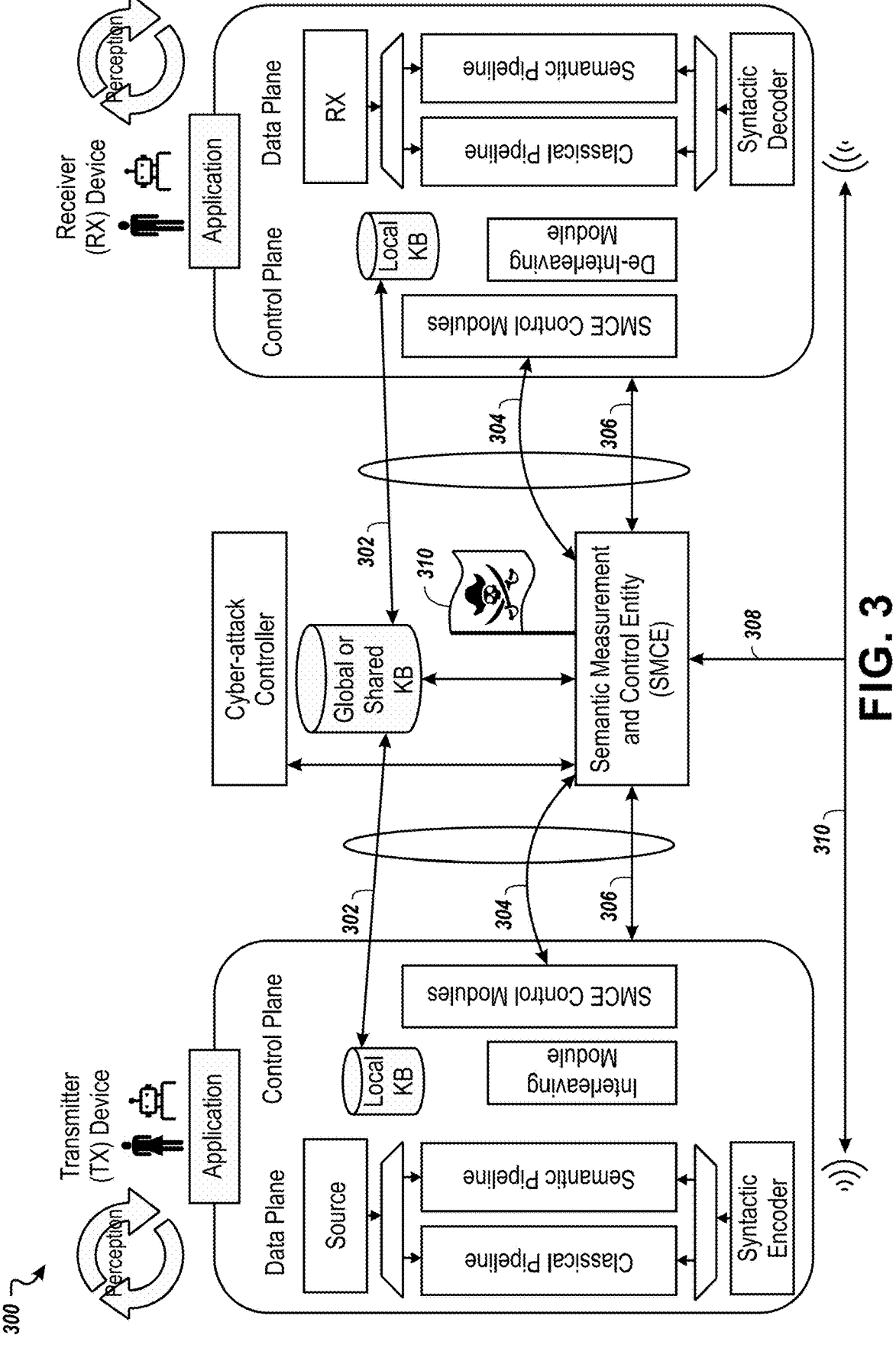
FIG. 3 illustrates an example of a semantic communications system with interleaved messages for cyber security.

FIG. 3 illustrates a semantic communications system 300 for semantic decoding cyber security. The semantic communication system 300 is similar to the communication system 200. A transmitter device includes an application in which a data plane executes, and the control plane executes. The data plane includes a data source that is in communication with both a classical pipeline and a semantic pipeline. Each of the classical pipeline and the semantic pipeline are output into a syntactic encoder which term is configured to communicate over a network on communications link 310 to the receiver, as described previously. The communication link 310 includes the channel, and the noise. Noise of the channel can be related to the semantic distortion detected by the receiver device. A probe 308 to the control plane is shown in which the SMCE receives data from the network 310. The SMCE is configured to measure semantic distortion and communicate with each of the transmitter and the receiver along communication links 306.

The tracking message $M^c$ is sent on link 306 for semantic coherency between SMCE and users, which is a control message. Communication links 306 enable the control messages and values of control parameters being sent from the SMCE to go to their respective transmitter and receiver devices.

Communication links 304 represent time periods over which traditional and semantic coded packets are sent from the MCE to the transmitter and the receiver. For each interleaving element time period $\tau_{i,u}$, the SMCE is configured to send interleaved semantic coded messages and traditional coded messages.

The SMCE is also configured to send a coherence time value $\tau^{coh}_{c,u}$ on links 302 to each of the transmitter and the receiver. The semantic coherence time value includes the time that there is not drastic change among consecutive messages from source. This change can be measures by meaning/perception/latent variables or the nature of the use case.

Red flag messages 310 include data signatures representing the message/meaning/situation that is prohibited by the application and should not be in the semantic of the message in any way. In case of observing these messages, the SMCE terminates communication between the transmitter and the receiver.

The semantic-based approach monitors results of the attacks rather than the source of the attack. The process of monitoring results of attacks with semantics has advantages for 6G use-cases, including a preemptive approach for machine-to-machine (M2M) approaches with red flag signals. The SMCE can be flexible and responsive to different sources of attacks for each application semantic-based attack detection can be considered a behavior-based mechanism to look at what the attack does, not what the source of the attack is. The SMCE can develop detection for a specific use-case which can be useful for use cases such as autonomous driving and autonomous navigation.

Figure 4:
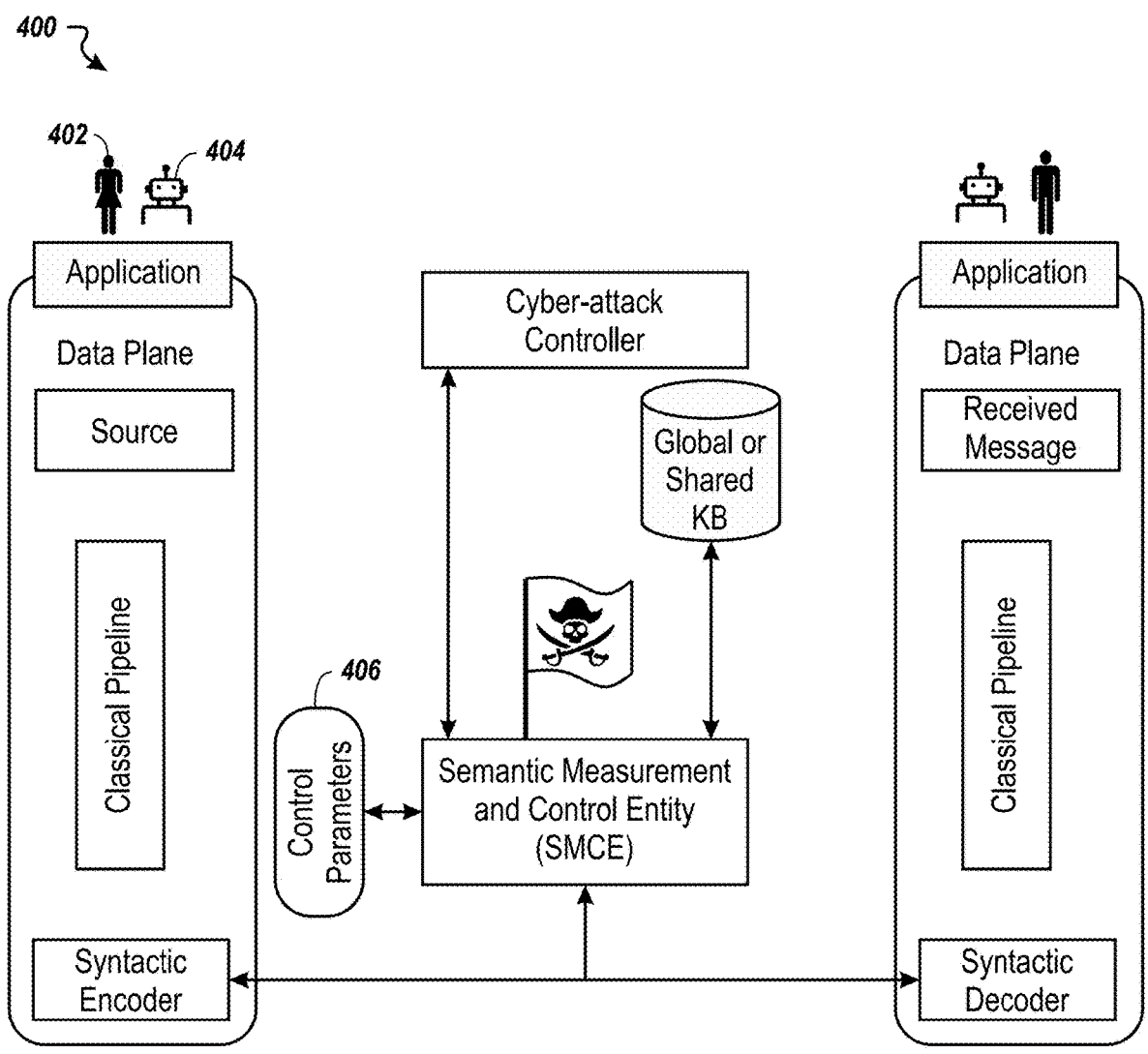
FIG. 4 illustrates an example of a semantic communications system with flag control parameters.

FIG. 4 illustrates a semantic communications system 400 with tuned semantic control parameters 406. The semantic communication system 400 can be similar to the semantic communication systems 200 and 300, previously described. As previously described, each of the transmitting and receiving devices can be representing a human user 402, or a machine user 404. Semantic communication system 400 shows a global or centralized semantic decoder (e.g., the SMCE) that is used for both the transmitter and the receiver. Syntactic encoders of each of the transmitter and the receiver are configured to communicate with the centralized SMCE. For a centralized scenario, there is no available semantic pipeline in the receiving or transmitting device. There is a global-KB in the centralized SMCE that includes either metadata or public data of users. A main transmission pipeline includes the traditional source coding with the following structure: the source coding $X_t \rightarrow$source coding $Xt \rightarrow$send to channel $Y^t_{signal\ at\ the\ receiver} \rightarrow Y^t_{detected\ signal}$. The SMCE derives the semantic message from G-KB inside of the SMCE based on sampling time. The SMCE performs tracking. At the SMCE, the control message $M^C$ is provided. This control message compares the output of semantic sample of the data with one reference point. All control parameters 406 are tuned inside of SMCE. Control parameters 406 include the coherence time value, the tracking message, and the sampling time period.

The SMCE provides the control message $M^C$ as follows. In a first option, the SMCE checks among two consecutive messages of one user for specific content. The SMCE compares these consecutive messages within the semantic coherence time. The SMCE measures a difference between two consecutive messages at the transmitter during two consecutive sampling times, wherein $M^{\tau S}=f(M^{\tau S},M^{\tau S-1})$. A value for the first message is zero. In a second step, the SMCE determines a value for a semantic distortion metric. The SMCE checks the variations of the semantic distortion. The SMCE checks the time window of two messages with the coherence time value. The coherence time value is the coherence time of the semantic messages for the user for particular content or a particular application. Specifically, the time coherence value represents a period of time over which the semantic distortion should remain within a threshold value or change less than the threshold value. The coherence time represents a unit of time in which the semantic context is not supposed to be changing for a particular use case, user, application, and so forth, if it changes detected, it is likely that there is a malicious attack on one of the semantic models. Specifically, if a value of the difference is greater than the threshold value, the SMCE puts the flag for this transmission as under monitor transmission. The SMCE sends the generated flag tag to the network for cyber-attack control entities. The message MC is the semantic distortion among these two messages. Generally, the sampling time is less than or equal to the coherence time value.

Figure 5:
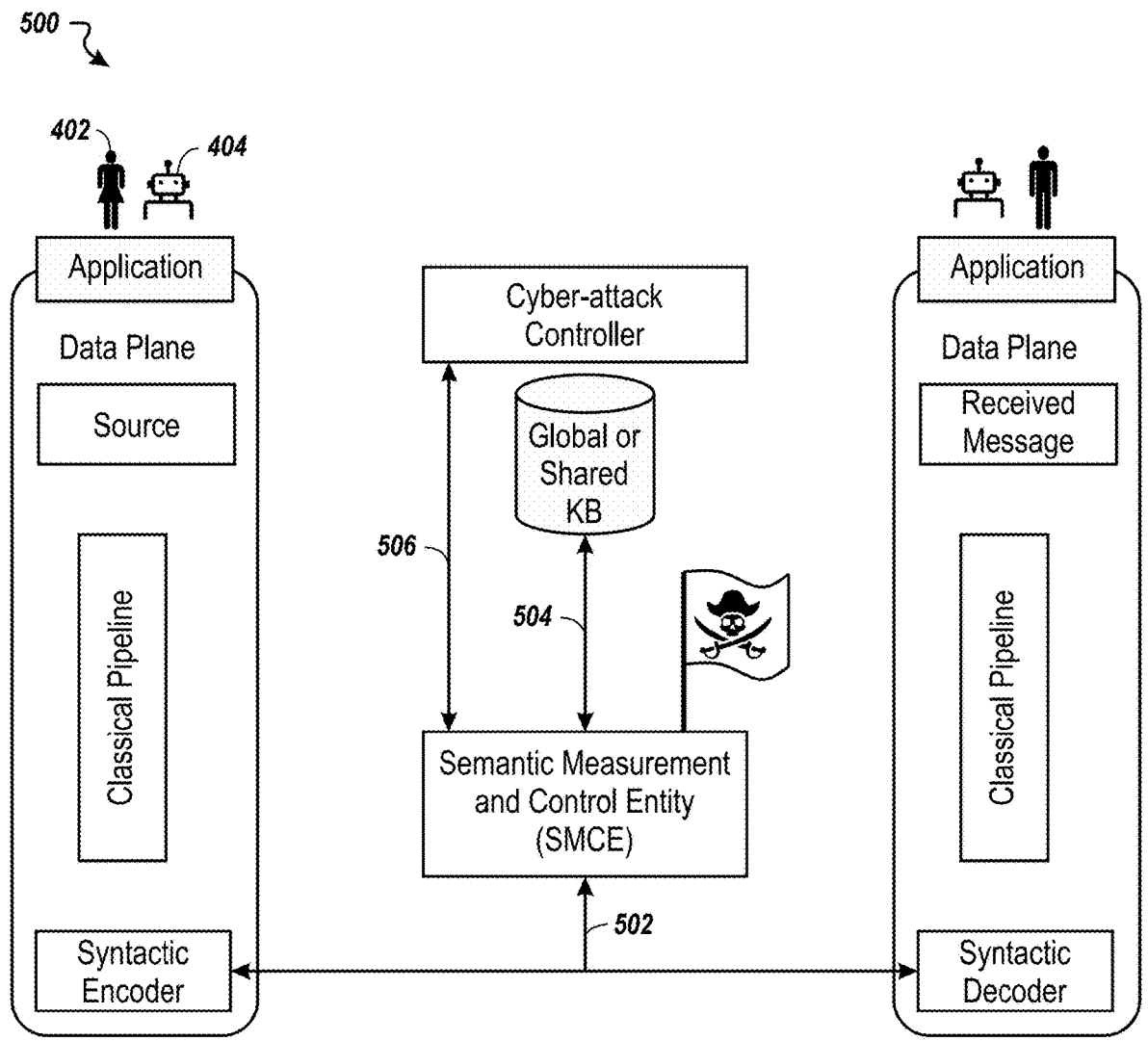
FIG. 5 illustrates an example of a semantic communications system showing control messages.

FIG. 5 illustrates a semantic communications system 500 showing control messages. The SMCE provides the control message to each of the transmitter and the receiver as now described. The SMCE validates the semantic message by comparing its metadata with the metadata of similar semantic messages for similar content. The SMCE, at control probe 502, compares a difference between the semantics of each message at the sampling time is compared with the semantics of the similar metadata content, which is available at the G-KB for SMCE. In this case, the message is $M^{\tau S}=f(M^{\tau S},\ M^{Meta-data})$. If the value of is greater than the specific value, at step 504 the SMCE puts the flag for this transmission to be under increased scrutiny, which is known as an under-control message. The SMCE sends this tag at step 506 to the network for cyber-attack control entities.

The SMCE can use an augmentation mechanism. In this case, the semantic message for comparing two signals is derived from the augmentation mechanism inside of the SMCE. For this case, the $MM^{\tau S}=f(MM^{\tau S},M^{Augmentation})$. If the value of is greater than the specific value, at step 504 the SMCE puts the flag for this transmission to be under increased scrutiny, which is known as an under-control message. The SMCE sends this tag at step 506 to the network for cyber-attack control entities.

Figure 6:
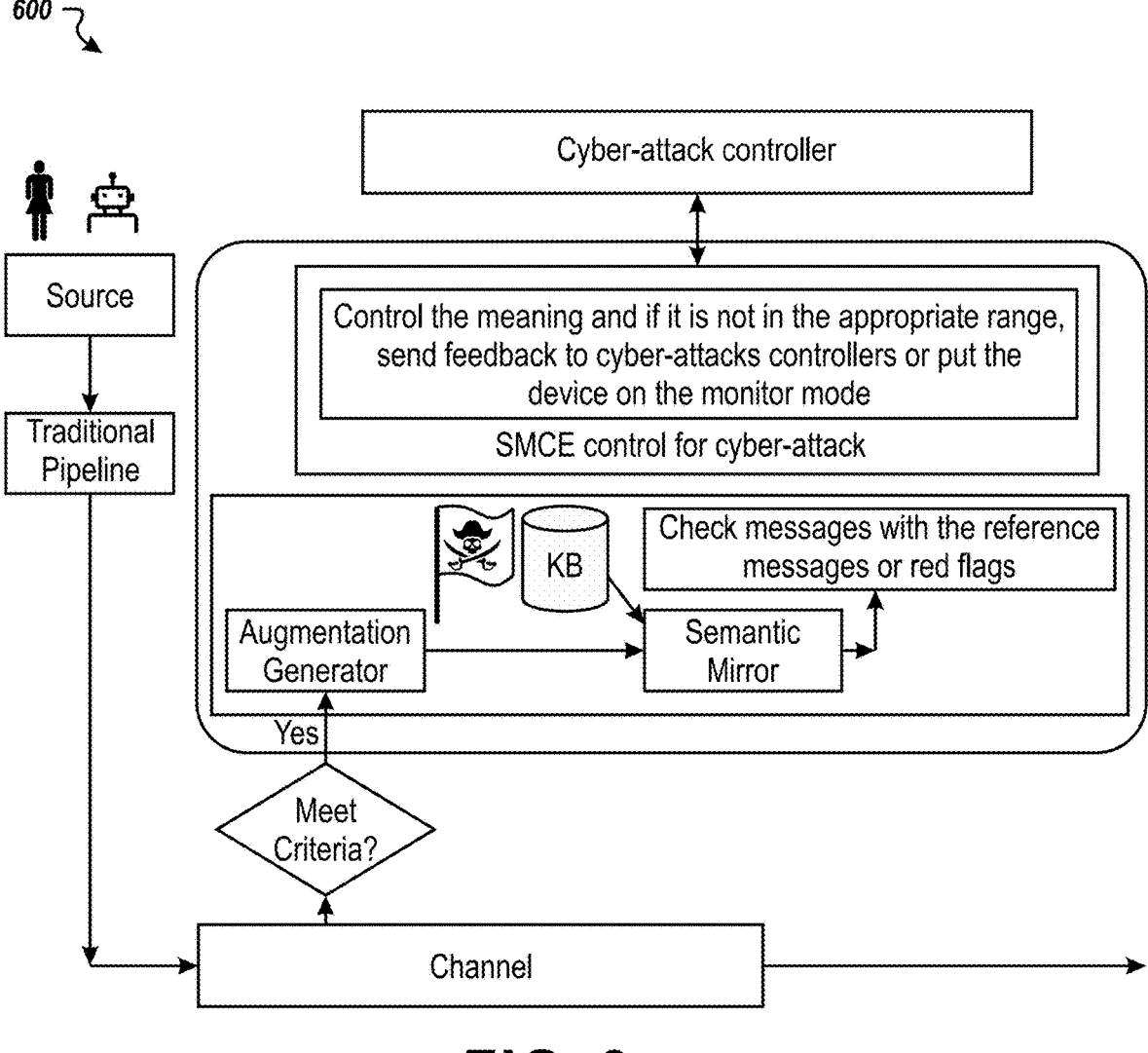
FIG. 6 illustrates an example of a semantic communications system using an augmentation message.

FIG. 6 illustrates a semantic communications system 600 using an augmentation message for cyber security. Semantic mirror and augmentation generator are defined in P58816. If the reference signal is used in SMCE, the SDI should be used to determine the distance between the meaning of the messages. When this distance is increasing, there is a chance of there being a poisoned model or other malicious messages. If red flag detection is used, then the proximity to the red flag messages is dangerous for the SMCE, because this means that the message contains an inappropriate semantic meaning. A prevention mechanism is initiated. The KB at SMCE can come from the global source G-KB of the content or from any sort of metadata of the same content. The control message $M^C$ should be provided for SMCE based on the background knowledge of the content.

The SMCE provides the control message as follows. The SMCE can check the message with some red flags. The SMCE compares a difference between the semantics of each message at the sampling time with the semantics of some red flag messages which are available at the G-KB for SMCE. In this case, the message is $M^{\tau S}=f(M^{\tau S}, M^{red\ flags})$ If the value of the $M^{\tau S}$ approaches zero or is below a given threshold value, there is unwanted content is inside of the message. The transmitting device is then flagged as "under-control," and further messages receive additional scrutiny or are rejected. The SMCE then sends this tag to the network for cyber-attack control entities or immediately interrupt the transmission.

Examples of red flags include the following. For machine-type communication, red flags include outlier messages or classification which is not compatible with the G-KB secure metadata. For example, the red flag is identified when an autonomous car changes its speed above the threshold of the specific area, turns in wrong directions, or performs undefined actions. In another example, a red flag for video data includes unwanted content or unwanted meaning or some text, audio, or video.

Figure 7:
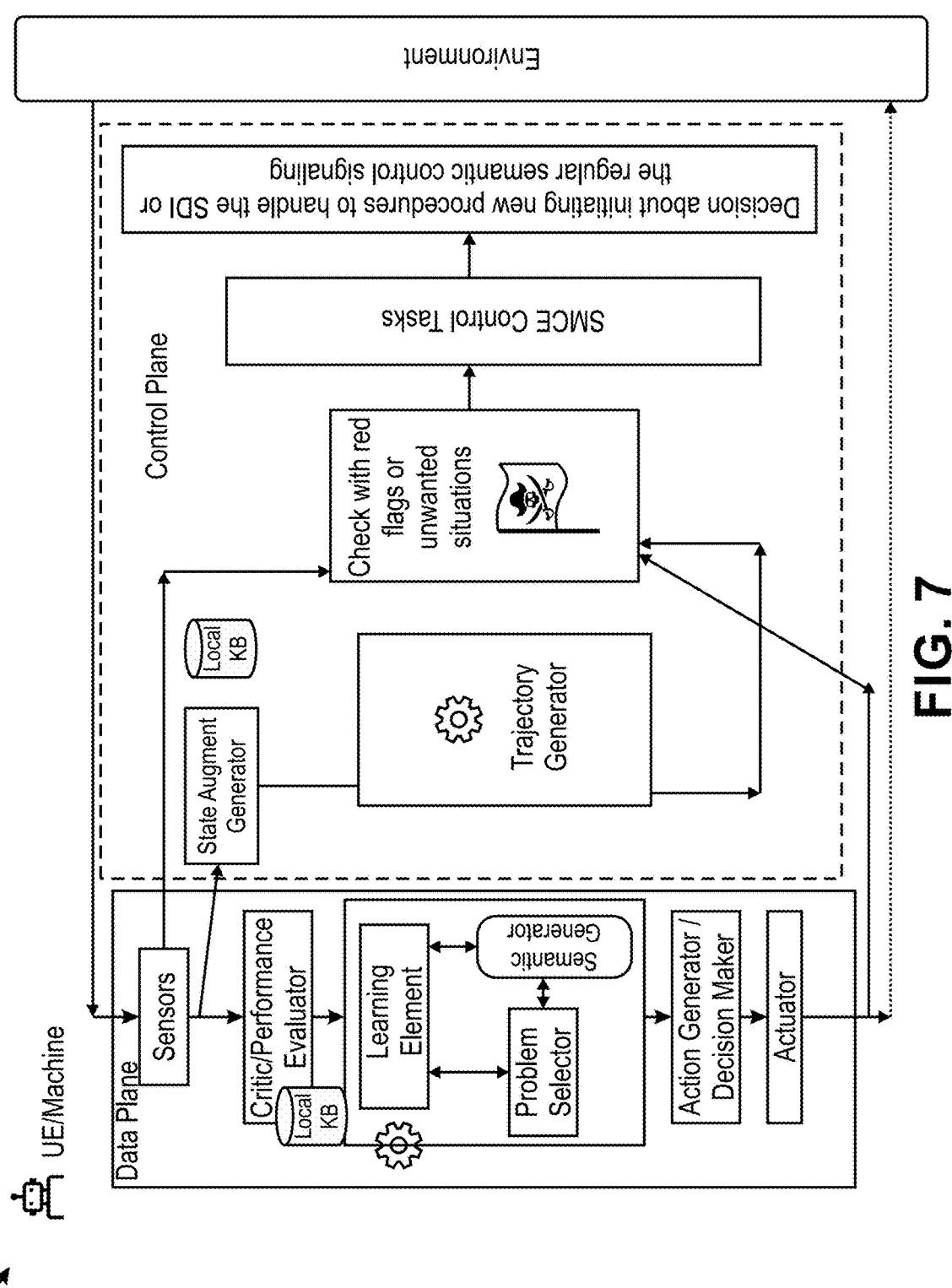
FIG. 7 illustrates an example of a semantic communications system that checks semantic communications using red flag messages.

FIG. 7 illustrates a semantic communications system 700 that checks semantic communications using red flag messages. The SMCE predicts near future states and actions. If the prediction meets one red flag, it means the system is not in its normal mode. For example, the models of the SMCE can include predicting a speed above the threshold for autonomous driving and a likely crash in the near future. The predictive approach increases a safety and privacy of the system model. Specifically, one or more sensors send data to a performance evaluation module that may have its own local KB model data. The performance evaluator transmits data to a trajectory generator, which can include a learning element. The learning element interfaces with a problem selector that selects the particular context associated with sensor data from the performance evaluator. The problem selector in turn works with the semantic generator to determine in which contexts the predicted semantic state indicates a potential issue. When a potential issue is identified, a control signal is sent from the problem selector to an action generator that generates a corrective action to prevent the issue from occurring or otherwise stop the communication from happening. For example, the action generator can send data to an actuator configured to physically interact with one or more hardware systems and change the state of the system to prevent the undesirable outcome from occurring. In this way, when the semantic data enable the system to predict an undesirable state of the system, the system cannot take a corrective action prior to that undesirable state actually occurring.

Figure 8:
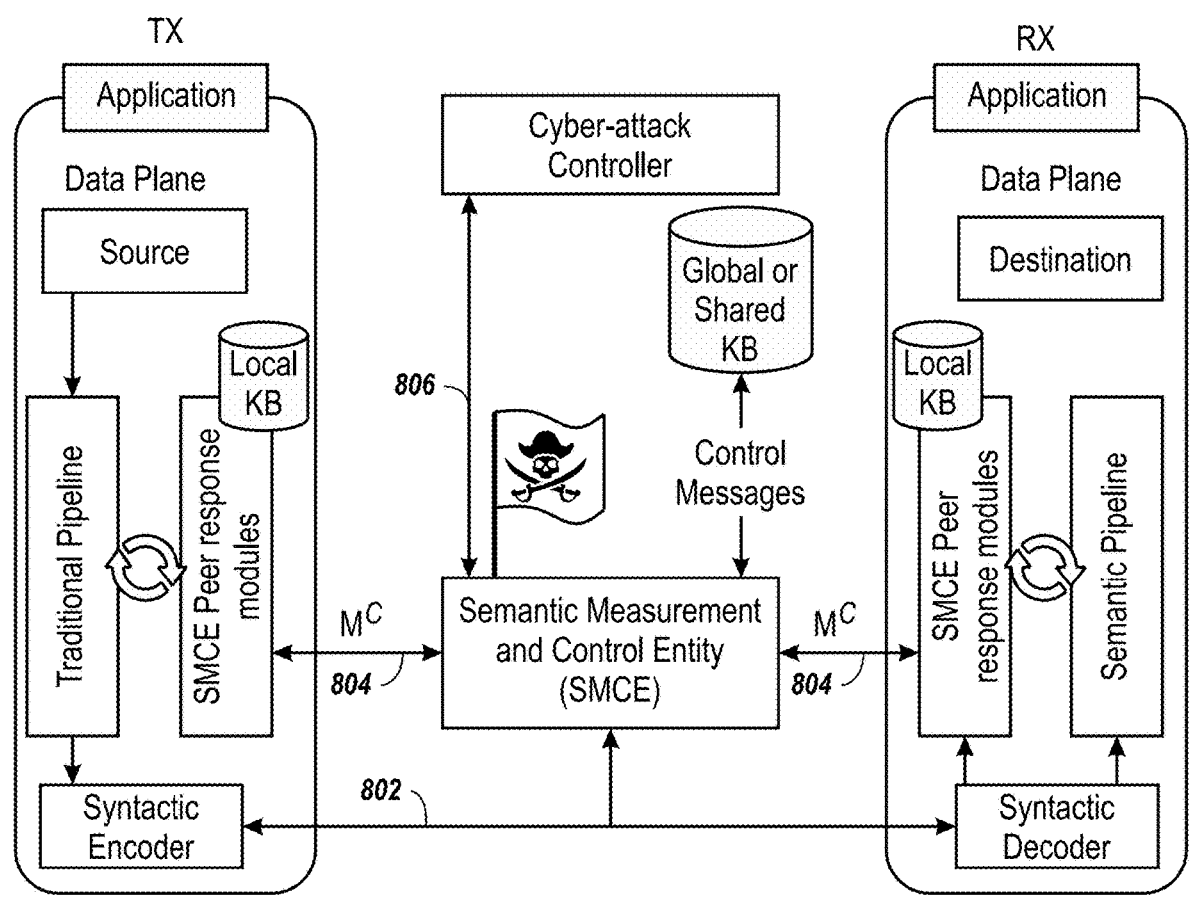
FIG. 8 illustrates an example of a semantic communications system with SMCE peer response modules.

FIG. 8 illustrates a semantic communications system 800 with SMCE peer response modules. An available semantic pipeline in the device is for controlling tasks and reporting to SMCE the semantic message. SMCE peer response modules can include a module that runs semantic coding just for SMCE requests and sends the coded message to SMCE for each device, including a transmitter and a receiver. A centralized SMCE controller is responsible for following the semantic coding of the messages. The centralized SMCE receives data from the communication link 802 between the transmitter and the receiver. The SMCE sends control messages $M^C$ over links 804 to SMCE peer response modules in each of the transmitter and the receiver. In this case, the message from the semantic pipeline is derived in both the devices and the SMCE. The Tx/Rx device transmits its message to the other device on link 802. The SMCE samples the message at $\tau_s$ and based on its own on G-KB there is $X^{\tau S}_{SMCE}\rightarrow$semantic coding $M^{\tau S}_{SMCE}$. $X^t\rightarrow$source coding $X^t\rightarrow$send to channel $Y^t_{Signal\ at\ RX}\rightarrow Y^t_{detect}$.

The tracking procedure is now described. The SMCE calculates $M^{\tau S}=f(M^{\tau S}, M^{\tau S-1})$ representing the distortion difference between messages based on one of the options previously described. The SMCE requests the users TX and RX to send the semantic messages portion of their semantic control plane for an additional check. The SMCE calculates two other control messages, including a control message based on the transmitter semantic distortion difference $M^{\tau S}_{TX}=f(M^{\tau S}, M^{\tau S}_{TX})$ and a control message based on the receiver semantic distortion difference $M^{\tau S}_{RX}=f(M^{\tau S}, M^{\tau S}_{RX})$. The SMCE makes a final depiction based on the aggregation of these three elements and sends feedback 806 to the cyber-attack controller.

To increase the privacy of the end-users, the SMCE can request the SMCE peer response module send the semantic messages, which can be augmented through one of the proposed approaches previously described. The SMCE cannot probe the samples of the users' data. In this case, per each sampling time TS, the users will send respective augmented messages $M^{\tau S}_{TX-Augmented}$ and $M^{\tau S}_{RX-Augmented}$ to the SMCE. The SMCE will calculate the message control, and in case of a large semantic distortion, the SMCE generates a message to alert the cyber-attack controller of the potential threat. All four distortion detection options for the control message generation can be applied.

Figure 9:
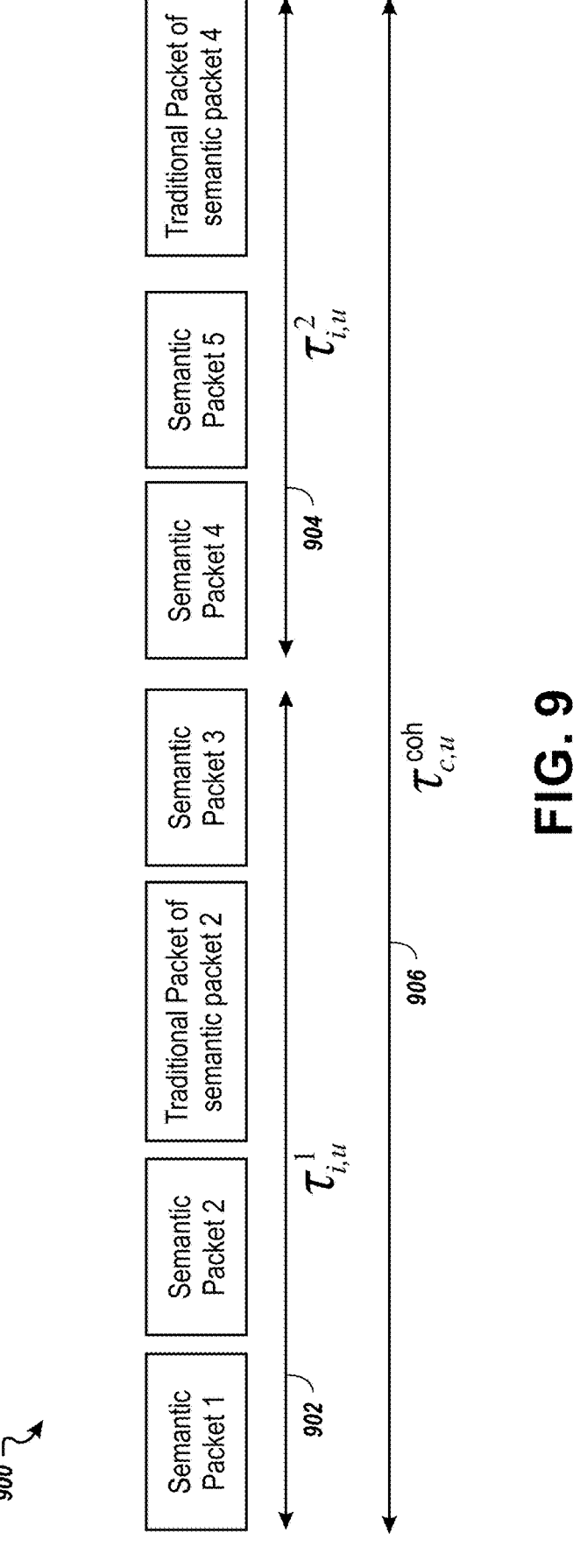
FIG. 9 illustrates an example of a communication scheme that includes interleaved messages for semantic communications.

The SMCE and SMCE peer response module can be considered as two virtual functions. The former sits in the network or cloud of the service provider, and the latter can be a virtual function implemented in devices of end-users. The cyber-attack controller can be another virtual entity in the cloud. Therefore, this approach can be implemented overlay of any existing wireless generation inside of the devices to help a service provider to provide a more secure connection for end-users FIG. 9 illustrates a communication scheme 900 that includes interleaved messages for semantic communications. In this scenario, traditional coding is used with semantic communication as a parallel pipeline. A main transmission is based on semantic coding. A new module is configured for interleaving semantic coded messages and traditional coded messages. The interleaving module is responsible for detection of semantic anomalies. When semantic source coding is a major coding, and traditional coding helps networks with the security of semantic coding, traditional coded messages are interleaved with semantic ones. This interleaving is controlled by the SMCE in a centralized manner or in a decentralized manner as previously described. $\tau_{i,u}$ is an interleaving time stamp for each period 902, 904. For each interleaving time stamp, at least one frame of traditional source coding is included in the coded stream. Interleaving has different parameters, than those previously described. For example, $\tau_{i,u}$ can represent a number of packets per each interleaving period 902, 904 and the interleaving approach of traditional and semantic packets. The SMCE can adjust all the parameters of the interleaving. Because there are two pipelines per device, the traditional packet can be redundant or not be redundant. For example, in the scheme 900, there are two interleaving periods 902, 904 where $\tau^1_{i,u} \geq \tau^2_{i,u}$. In each period 902, 904, there is one traditional packet that is redundant to the semantic packet for the overall transmission time window 906, which is designated by a coherence time value $\tau^{coh}_{c,u}$.

Figure 10:
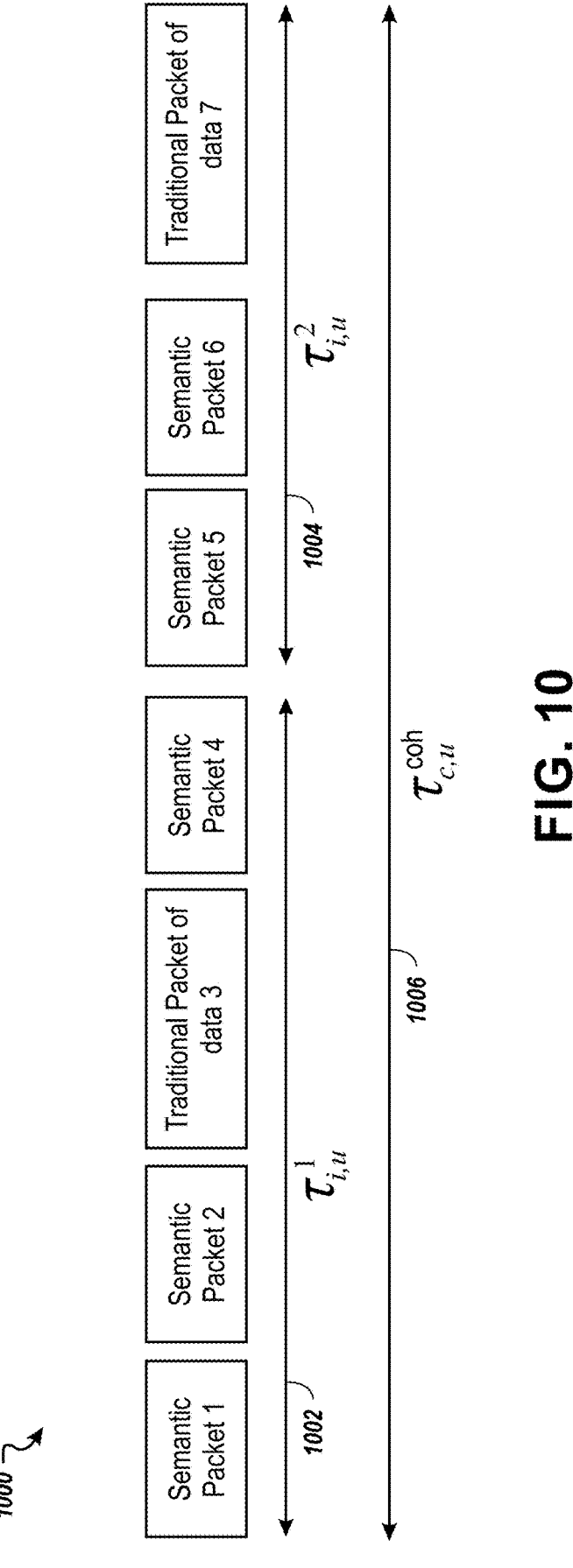
FIG. 10 illustrates an example of a communication scheme that includes interleaved messages for semantic communications.

FIG. 10 illustrates a communication scheme 1000 that includes interleaved messages for semantic communications. In scheme 1000, there are two interleaving periods 1002, 1004 where $\tau^1_{i,u} \geq \tau^2_{i,u}$, and in each duration, there traditional packet that is not redundant to the semantic packet. These interleaved messages are decoded in SMCE controller modules and compared with existing coded messages from semantics. All previously described methods for semantic distortion measurement can be applied here to follow the distortion trends. The SMCE can use the coherence time value $\tau^{coh}_{c,u}$ as a window 1006 to process SDI larger than the usual behavior of the semantic applications. In another example, the SMCE can use the red flag messages to process SDI larger than the usual behavior of the semantic applications. The red flag can be defined according to the user preferences, and therefore, the SMCE can provide a more trustful, secure, and safe environment for the users. If the distance between the two coded messages is greater than the expected value, SMCE initiates the controlling procedures, including synchronization between RX and TX, and an under-control scenario where the SMCE asks for more frequent interleaving to realize if the message has inherent semantic distortion, or it is under attack. The SMCE can be implemented in a distributed manner among users. Both internal and external loops and interleaving messages can be applied for security reasons and control procedures. A given semantic coherence time value can be learned based on the available history of the applications or through the online process. The semantic coherence time value is therefore dynamic and controlled for each particular context. A first context, such as autonomous driving, may have a first coherence time value, while another context, such as a video call, may have a different coherence time value.

FIG. 11 illustrates a flowchart of an example method 1100, according to some implementations. For clarity of presentation, the description that follows generally describes method 1100 in the context of the other figures in this description. For example, method 1100 can be performed by the SMCE of FIGS. 3 to 8. It will be understood that method 1100 can be performed, for example, by any suitable system, environment, software, hardware, or a combination of systems, environments, software, and hardware, as appropriate. In some implementations, various steps of method 1100 can be run in parallel, in combination, in loops, or in any order. The example method 1100 shown in FIG. 11 can be modified or reconfigured to include additional, fewer, or different steps (not shown in FIG. 11), which can be performed in the order shown or in a different order.

The method 1100 includes receiving (1102), at a controller, coded data comprising a plurality of data elements, each data element comprising a coded message. The method 1100 includes determining (1104), for a coded message and based on a semantic model associated with the controller, a semantic distortion value, the semantic model comprising one or more classifiers configured to identify a desired meaning of a given coded message based on a context of the given coded message. The method 1100 includes determining (1106) a difference between the semantic distortion value and a baseline semantic distortion value. The method 1100 includes generating (1108), when the difference exceeds a threshold value, a security message indicating a potential security issue.

In some implementations, wherein the semantic distortion value represents a value for each of one or more semantic parameters associated with the coded message, and wherein the baseline semantic distortion value represents an expected value for each of one or more semantic parameters associated with the coded message.

In some implementations, the security message comprises a flag indicating the potential security issue, the flag being transmitted with the coded message to a remote device.

In some implementations, the coded message is a first coded message. In some implementations, determining the difference between the semantic distortion value and the baseline semantic distortion value comprises: determining, for a second coded message and based on the semantic model, a second semantic distortion value representing the baseline semantic distortion value; determining a difference between the semantic distortion value and the second semantic distortion value; and generating, when the difference exceeds the threshold value, the security message indicating the potential security issue.

In some implementations, the first coded message and the second coded message are received within a predefined time period during which changes to one or more semantic parameters associated with each of the coded messages should deviate less than predefined thresholds for each of the one or more semantic parameters.

In some implementations, the first coded message and the second coded message are received consecutively.

In some implementations, determining the difference between the semantic distortion value and the baseline semantic distortion value comprises: accessing, from a local data source, a baseline message associated with the semantic model; determining, based on the semantic model, a specific semantic distortion value for the baseline message, the specific semantic distortion value being the baseline semantic distortion value; determining a difference between the semantic distortion value and the specific semantic distortion value; and generating, when the difference exceeds the threshold value, the security message indicating the potential security issue.

In some implementations, the baseline message comprises a metadata message for content associated with the coded message.

In some implementations, determining the difference between the semantic distortion value and the baseline semantic distortion value comprises: generating an augmented semantic message representing an expected semantic message for a receiving device; determining, based on the semantic model, a specific semantic distortion value for the augmented semantic message, the specific semantic distortion value being the baseline semantic distortion value; determining a difference between the semantic distortion value and the specific semantic distortion value; and generating, when the difference exceeds the threshold value, the security message indicating the potential security issue.

In some implementations, determining the difference between the semantic distortion value and the baseline semantic distortion value comprises: accessing, from a local data source, a red flag message associated with a known security issue for the semantic model; determining, based on the semantic model, a specific semantic distortion value for the red flag message, the specific semantic distortion value being the baseline semantic distortion value; determining a difference between the semantic distortion value and the specific semantic distortion value; and generating, when the difference is within the threshold value, the security message indicating the potential security issue.

In some implementations, the syntactically encoded data is received from the first computer system via a wireless network. In some implementations, the second computer system is a user equipment (UE) of a wireless network. In some implementations, the second computer system is a base station of a wireless network.

FIG. 12 illustrates a flowchart of an example method 1200, according to some implementations. For clarity of presentation, the description that follows generally describes method 1200 in the context of the other figures in this description. For example, method 1200 can be performed by the SMCE of FIGS. 3 to 8. It will be understood that method 1200 can be performed, for example, by any suitable system, environment, software, hardware, or a combination of systems, environments, software, and hardware, as appropriate. In some implementations, various steps of method 1200 can be run in parallel, in combination, in loops, or in any order. The example method 1200 shown in FIG. 12 can be modified or reconfigured to include additional, fewer, or different steps (not shown in FIG. 12), which can be performed in the order shown or in a different order.

In an aspect, the method 1200 includes receiving (1202), at a controller, coded data comprising a plurality of data elements, the data elements comprising a set of first data elements comprising coded messages that are interleaved with a set of second data elements comprising semantic coded messages. The method 1200 includes determining (1204), for a coded message of the first set of data elements, a first semantic distortion value, the determining based on a semantic model comprising one or more classifiers configured to identify a desired meaning of a given coded message based on a context of the given coded message. The method 1200 includes determining (1206), based on the semantic model, for a semantic coded message of the second set of data elements and that corresponds to the coded message, a second semantic distortion value. The method 1200 includes generating (1208), responsive to determining that a difference between the first semantic distortion value and the second semantic distortion value exceeds a threshold value, a security message indicating a potential security issue.

In some implementations, the estimating is based on a local semantic model stored at a location of the controller. In some implementations, the first semantic distortion value represents a value for each of one or more semantic parameters associated with the coded message, and wherein the second semantic distortion value represents a value for each of one or more semantic parameters associated with the semantic coded message.

In some implementations, the method 1200 includes receiving, with the coded data, an interleaving element that specifies an interleaving period in which at least one of the first data elements is interleaved into the set of second data elements. In some implementations, the interleaving element specifies a time period. In some implementations, the interleaving element specifies a number of data elements. In some implementations, an interleaving period includes at least one first data element that includes first information that is redundant with second information of at least one second data element. In some implementations, an interleaving period includes at least one first data element that includes first information received instead of second information of at least one second data element.

In some implementations, the method 1200 includes receiving, in a tracking message with the coded data, a semantic coherence time parameter that specifies a length of time during which changes to one or more semantic parameters of the set of second data elements should deviate less than a specified threshold value. In some implementations, the one or more semantic parameters include at least one of a semantic meaning parameter, a semantic perception parameter, or a latent variable value.

In some implementations, the method 1200 includes receiving, with the coded data, a semantic coherence time parameter that specifies a length of time during which differences among semantic distortion values should deviate less than the threshold value unless there is the potential security issue. In some implementations, the length of time adjusted based on historic data associated with an application, the historic data specifying nominal semantic behavior for the application, anomalous semantic behavior the application, or a combination thereof.

In some implementations, the security message comprises a request to increase an interleave frequency of the set of first data elements with the set of second data elements.

In some implementations, the second computer system is a user equipment (UE) of a wireless network. In some implementations, the second computer system is a base station of a wireless network.

Figure 13:
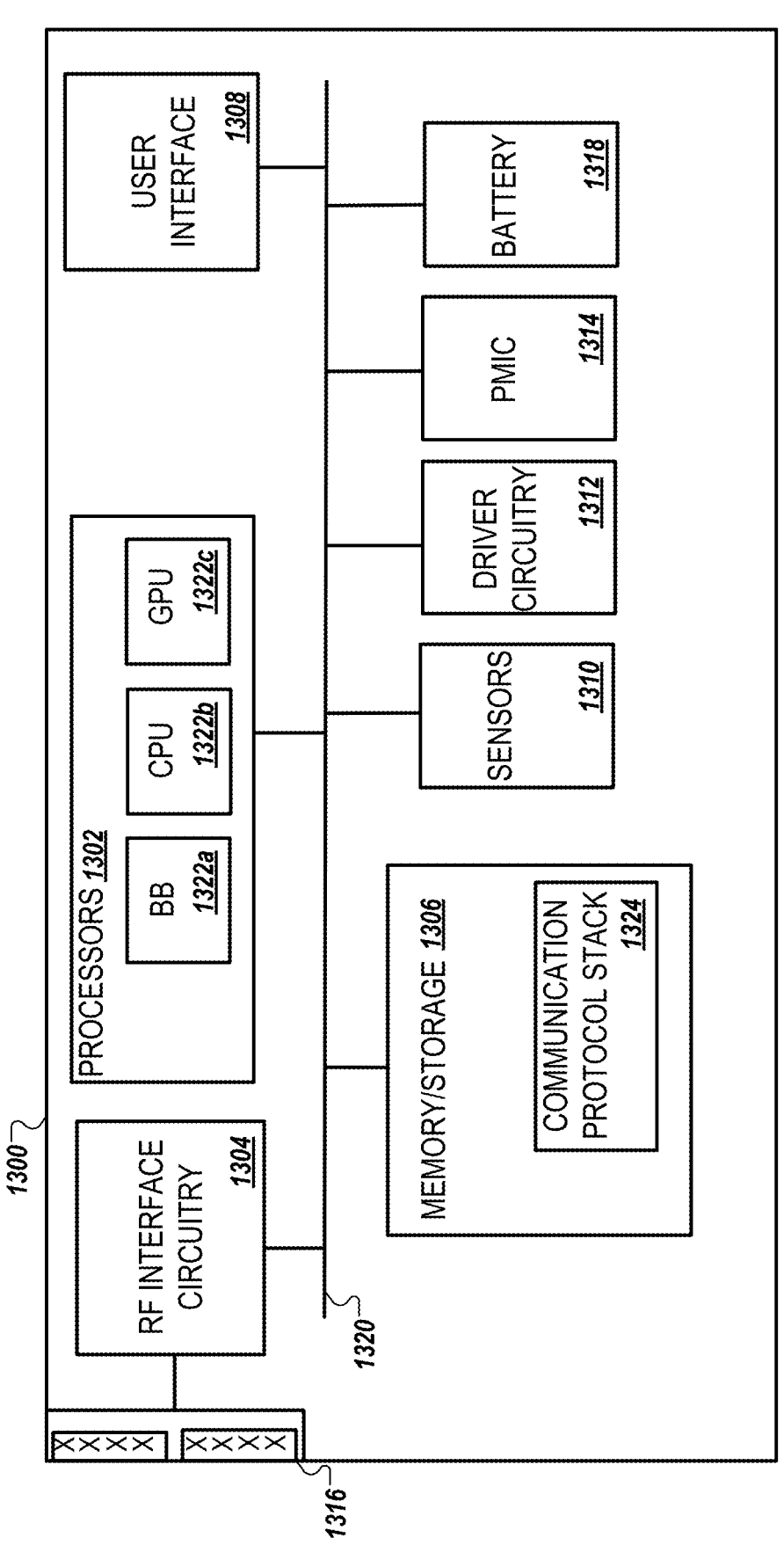
FIG. 13 illustrates an example user equipment (UE).

FIG. 13 illustrates an example UE 1300, according to some implementations. The UE 1300 may be similar to and substantially interchangeable with UE 102 of FIG. 1.

The UE 1300 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 1300 may include processors 1302, RF interface circuitry 1304, memory/storage 1306, user interface 1308, sensors 1310, driver circuitry 1312, power management integrated circuit (PMIC) 1314, one or more antenna(s) 1316, and battery 1318. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1320, which may represent any type of interface, input/output, bus (local, system, or expansion), transmission line, trace, optical connection, etc. that allows various circuit components (on common or different chips or chipsets) to interact with one another.

The processors 1302 may include processor circuitry such as, for example, baseband processor circuitry (BB) 1322A, central processor unit circuitry (CPU) 1322B, and graphics processor unit circuitry (GPU) 1322C. The processors 1302 may include any type of circuitry or processor circuitry that executes or otherwise operates computer-executable instructions, such as program code, software modules, or functional processes from memory/storage 1306 to cause the UE 1300 to perform operations as described herein.

In some implementations, the baseband processor circuitry 1322A may access a communication protocol stack 1324 in the memory/storage 1306 to communicate over a 3GPP compatible network. In general, the baseband processor circuitry 1322A may access the communication protocol stack to perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 1304. The baseband processor circuitry 1322A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 1306 may include one or more non-transitory, computer-readable media that includes instructions (for example, communication protocol stack 1324) that may be executed by one or more of the processors 1302 to cause the UE 1300 to perform various operations described herein. The memory/storage 1306 include any type of volatile or non-volatile memory that may be distributed throughout the UE 1300. In some implementations, some of the memory/storage 1306 may be located on the processors 1302 themselves (for example, L1 and L2 cache), while other memory/storage 1306 is external to the processors 1302 but accessible thereto via a memory interface. The memory/storage 1306 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1304 may include transceiver circuitry and radio frequency front-end module (RFEM) that allows the UE 1300 to communicate with other devices over a radio access network. The RF interface circuitry 1304 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna(s) 1316 and proceed to filter and amplify (with a low-noise amplifier) the signal. The signal may be provided to a receiver of the transceiver that downconverts the RF signal into a baseband signal that is provided to the baseband processor of the processors 1302.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna(s) 1316. In various implementations, the RF interface circuitry 1304 may be configured to transmit/receive signals in a manner compatible with NR access technologies.

The antenna(s) 1316 may include one or more antenna elements to convert electrical signals into radio waves to travel through the air and to convert received radio waves into electrical signals. The antenna elements may be arranged into one or more antenna panels. The antenna(s) 1316 may have antenna panels that are omnidirectional, directional, or a combination thereof to enable beamforming and multiple input, multiple output communications. The antenna(s) 1316 may include microstrip antennas, printed antennas fabricated on the surface of one or more printed circuit boards, patch antennas, phased array antennas, etc. The antenna(s) 1316 may have one or more panels designed for specific frequency bands including bands in FR1 or FR2.

The user interface 1308 includes various input/output (I/O) devices designed to enable user interaction with the UE 1300. The user interface 1308 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs", LED displays, quantum dot displays, projectors, etc.), with the output of characters, graphics, multimedia objects, and the like being generated or produced from the operation of the UE 1300.

The sensors 1310 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nano-electromechanical systems including 3-axis accelerometers, 3-axis gyroscopes, or magnetometers; level sensors; temperature sensors (for example, thermistors); pressure sensors; image capture devices (for example, cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1312 may include software and hardware elements that operate to control particular devices that are embedded in the UE 1300, attached to the UE 1300, or otherwise communicatively coupled with the UE 1300. The driver circuitry 1312 may include individual drivers allowing other components to interact with or control various input/output (I/O) devices that may be present within, or connected to, the UE 1300. For example, driver circuitry 1312 may include a display driver to control and allow access to a display device, a touchscreen driver to control and allow access to a touchscreen interface, sensor drivers to obtain sensor readings of sensors 1310 and control and allow access to sensors 1310, drivers to obtain actuator positions of electro-mechanic components or control and allow access to the electro-mechanic components, a camera driver to control and allow access to an embedded image capture device, audio drivers to control and allow access to one or more audio devices.

The PMIC 1314 may manage power provided to various components of the UE 1300. In particular, with respect to the processors 1302, the PMIC 1314 may control power-source selection, voltage scaling, battery charging, or DC-to-DC conversion.

In some implementations, the PMIC 1314 may control, or otherwise be part of, various power saving mechanisms of the UE 1300. A battery 1318 may power the UE 1300, although in some examples the UE 1300 may be mounted deployed in a fixed location and may have a power supply coupled to an electrical grid. The battery 1318 may be a lithium ion battery, a metal-air battery, such as a zinc-air battery, an aluminum-air battery, a lithium-air battery, and the like. In some implementations, such as in vehicle-based applications, the battery 1318 may be a typical lead-acid automotive battery.

Figure 14:
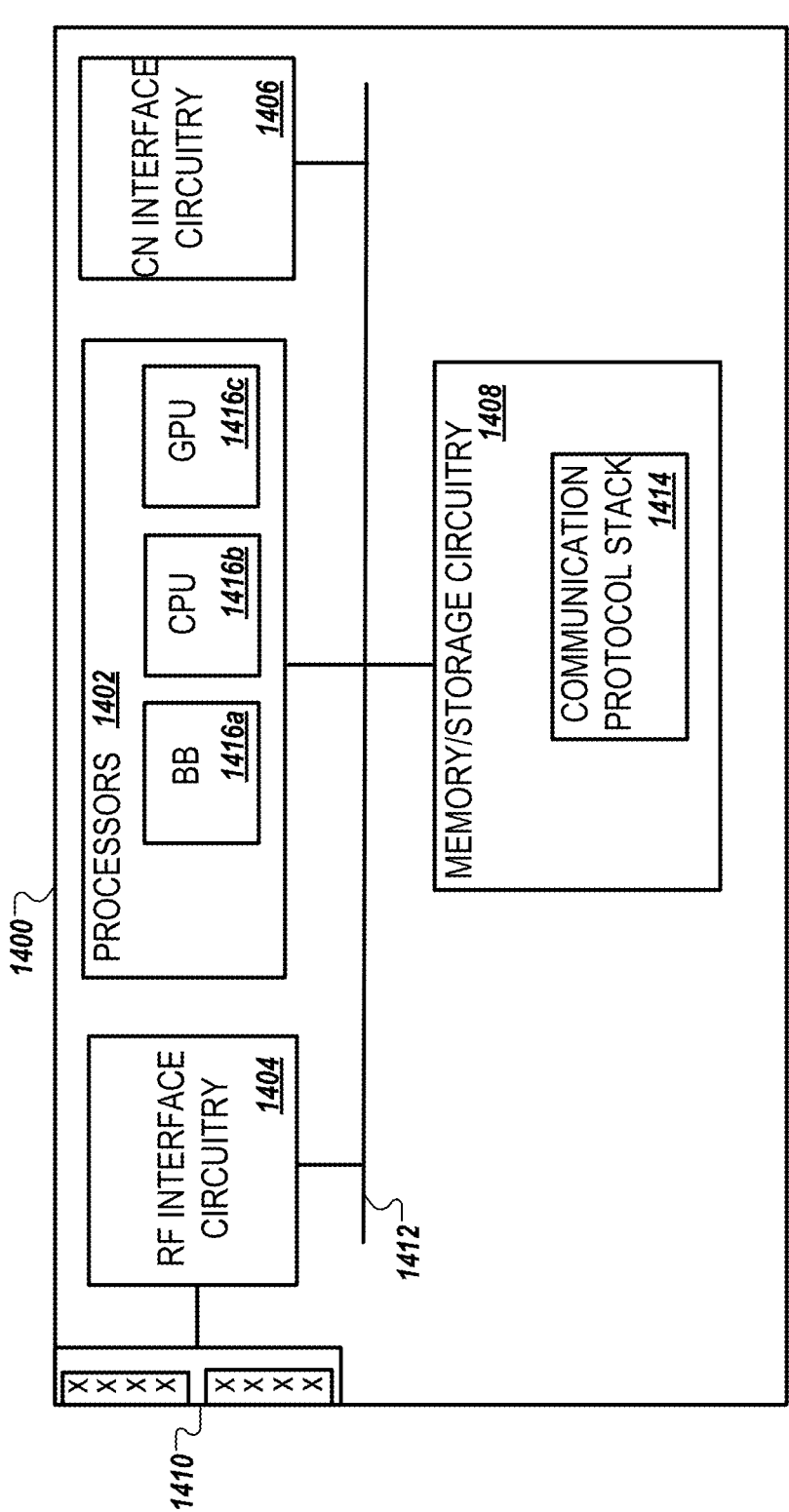
FIG. 14 illustrates an example access node.

FIG. 14 illustrates an example access node 1400 (e.g., a base station or gNB), according to some implementations. The access node 1400 may be similar to and substantially interchangeable with base station 104. The access node 1400 may include processors 1402, RF interface circuitry 1404, core network (CN) interface circuitry 1406, memory/storage circuitry 1408, and one or more antenna(s) 1410.

The components of the access node 1400 may be coupled with various other components over one or more interconnects 1412. The processors 1402, RF interface circuitry 1404, memory/storage circuitry 1408 (including communication protocol stack 1414), antenna(s) 1410, and interconnects 1412 may be similar to like-named elements shown and described with respect to FIG. 13. For example, the processors 1402 may include processor circuitry such as, for example, baseband processor circuitry (BB) 1416A, central processor unit circuitry (CPU) 1416B, and graphics processor unit circuitry (GPU) 1416C.

The CN interface circuitry 1406 may provide connectivity to a core network, for example, a 5th Generation Core network (5GC) using a 5GC-compatible network interface protocol such as carrier Ethernet protocols, or some other suitable protocol. Network connectivity may be provided to/from the access node 1400 via a fiber optic or wireless backhaul. The CN interface circuitry 1406 may include one or more dedicated processors or FPGAs to communicate using one or more of the aforementioned protocols. In some implementations, the CN interface circuitry 1406 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 1400 that operates in an NR or 5G system (for example, a gNB), and the term "E-UTRAN node" or the like may refer to an access node 1400 that operates in an LTE or 4G system (e.g., an eNB).

According to various implementations, the access node 1400 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 1400 may be implemented as one or more software entities running on server computers as part of a virtual network, which may be referred to as a CRAN and/or a virtual baseband unit pool (vBBUP). In V2X scenarios, the access node 1400 may be or act as a "Roadside Unit". The term "Roadside Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes receiving coded data comprising a plurality of data elements, each data element comprising a coded message; determining, for a coded message and based on a semantic model associated with a device, a semantic distortion value, the semantic model comprising one or more classifiers configured to identify a desired meaning of a given coded message based on a context of the given coded message; determining a difference between the semantic distortion value and a baseline semantic distortion value; and generating, when the difference exceeds a threshold value, a security message indicating a potential security issue.

Example 2 may include any of the features of example 1, wherein the semantic distortion value represents a value for each of one or more semantic parameters associated with the coded message, and wherein the baseline semantic distortion value represents an expected value for each of one or more semantic parameters associated with the coded message.

Example 3 may include any of the features of examples 1-2, wherein the security message comprises a flag indicating the potential security issue, the flag being transmitted with the coded message to a remote device.

Example 4 may include any of the features of examples 1-3, wherein the coded message is a first coded message, and wherein determining the difference between the semantic distortion value and the baseline semantic distortion value comprises: determining, for a second coded message and based on the semantic model, a second semantic distortion value representing the baseline semantic distortion value; determining a difference between the semantic distortion value and the second semantic distortion value; and generating, when the difference exceeds the threshold value, the security message indicating the potential security issue.

Example 5 may include any of the features of examples 1-4, wherein the first coded message and the second coded message are received within a predefined time period during which changes to one or more semantic parameters associated with each of the coded messages should deviate less than predefined thresholds for each of the one or more semantic parameters Example 6 may include any of the features of examples 1-5, wherein the first coded message and the second coded message are received consecutively.

Example 7 may include any of the features of examples 1-6, wherein determining the difference between the semantic distortion value and the baseline semantic distortion value comprises: accessing, from a local data source, a baseline message associated with the semantic model; determining, based on the semantic model, a specific semantic distortion value for the baseline message, the specific semantic distortion value being the baseline semantic distortion value; determining a difference between the semantic distortion value and the specific semantic distortion value; and generating, when the difference exceeds the threshold value, the security message indicating the potential security issue.

Example 8 may include any of the features of examples 1-7, wherein the baseline message comprises a metadata message for content associated with the coded message.

Example 9 may include any of the features of examples 1-8, wherein determining the difference between the semantic distortion value and the baseline semantic distortion value comprises: generating an augmented semantic message representing an expected semantic message for a receiving device; determining, based on the semantic model, a specific semantic distortion value for the augmented semantic message, the specific semantic distortion value being the baseline semantic distortion value; determining a difference between the semantic distortion value and the specific semantic distortion value; and generating, when the difference exceeds the threshold value, the security message indicating the potential security issue.

Example 10 may include any of the features of examples 1-9, wherein determining the difference between the semantic distortion value and the baseline semantic distortion value comprises: accessing, from a local data source, a red flag message associated with a known security issue for the semantic model; determining, based on the semantic model, a specific semantic distortion value for the red flag message, the specific semantic distortion value being the baseline semantic distortion value; determining a difference between the semantic distortion value and the specific semantic distortion value; and generating, when the difference is within the threshold value, the security message indicating the potential security issue.

Example 11 may include any of the features of examples 1-10, wherein the second computer system is a user equipment (UE) of a wireless network.

Example 12 may include any of the features of examples 1-11, wherein the second computer system is a base station of a wireless network.

Example 13 includes receiving coded data comprising a plurality of data elements, the data elements comprising a set of first data elements comprising coded messages that are interleaved with a set of second data elements comprising semantic coded messages; determining, for a coded message of the first set of data elements, a first semantic distortion value, the determining based on a semantic model comprising one or more classifiers configured to identify a desired meaning of a given coded message based on a context of the given coded message; determining, based on the semantic model, for a semantic coded message of the second set of data elements and that corresponds to the coded message, a second semantic distortion value; and generating, responsive to determining that a difference between the first semantic distortion value and the second semantic distortion value exceeds a threshold value, a security message indicating a potential security issue.

Example 14 includes may include any of the features of example 13, wherein the estimating is based on a local semantic model stored at a location proximate a controller configured to perform the method.

Example 15 includes may include any of the features of examples 13-14, wherein the first semantic distortion value represents a value for each of one or more semantic parameters associated with the coded message, and wherein the second semantic distortion value represents a value for each of one or more semantic parameters associated with the semantic coded message.

Example 16 includes may include any of the features of examples 13-15, further including receiving, with the coded data, an interleaving element that specifies an interleaving period in which at least one of the first data elements is interleaved into the set of second data elements.

Example 17 includes may include any of the features of examples 13-16, wherein the interleaving element specifies a time period.

Example 18 includes may include any of the features of examples 13-17, wherein an interleaving period includes at least one first data element that includes first information that is redundant with second information of at least one second data element.

Example 19 includes may include any of the features of examples 13-18, wherein an interleaving period includes at least one first data element that includes first information received instead of second information of at least one second data element.

Example 20 includes may include any of the features of examples 13-19, further including receiving, in a tracking message with the coded data, a semantic coherence time parameter that specifies a length of time during which changes to one or more semantic parameters of the set of second data elements should deviate less than a specified threshold value.

Example 21 includes may include any of the features of examples 13-20, wherein the one or more semantic parameters include at least one of a semantic meaning parameter, a semantic perception parameter, or a latent variable value.

Example 21 includes may include any of the features of examples 13-20, further including receiving, with the coded data, a semantic coherence time parameter that specifies a length of time during which differences among semantic distortion values should deviate less than the threshold value unless there is the potential security issue.

Example 21 includes may include any of the features of examples 13-20, wherein the length of time adjusted based on historic data associated with an application, the historic data specifying nominal semantic behavior for the application, anomalous semantic behavior the application, or a combination thereof.

Example 22 includes may include any of the features of examples 13-20, wherein the security message comprises a request to increase an interleave frequency of the set of first data elements with the set of second data elements.

Example 23 may include one or more non-transitory computer-readable media including instructions to cause an electronic device, upon execution of the instructions by one or more processors of the electronic device, to perform one or more elements of a method described in or related to any of examples 1-22, or any other method or process described herein.

Example 24 may include an apparatus including logic, modules, or circuitry to perform one or more elements of a method described in or related to any of examples 1-22, or any other method or process described herein.

Example 25 may include a method, technique, or process as described in or related to any of examples 1-22, or portions or parts thereof.

Example 26 may include an apparatus including: one or more processors and one or more computer-readable media including instructions that, when executed by the one or more processors, cause the one or more processors to perform the method, techniques, or process as described in or related to any of examples 1-22, or portions thereof.

Example 27 may include a signal as described in or related to any of examples 1-22, or portions or parts thereof.

Example 28 may include a datagram, information element, packet, frame, segment, PDU, or message as described in or related to any of examples 1-22, or portions or parts thereof, or otherwise described in the present disclosure.

Example 29 may include a signal encoded with data as described in or related to any of examples 1-22, or portions or parts thereof, or otherwise described in the present disclosure.

Example 30 may include a signal encoded with a datagram, IE, packet, frame, segment, PDU, or message as described in or related to any of examples 1-22, or portions or parts thereof, or otherwise described in the present disclosure.

Example 31 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example 32 may include a computer program including instructions, wherein execution of the program by a processing element is to cause the processing element to carry out the method, techniques, or process as described in or related to any of examples 1-22, or portions thereof. The operations or actions performed by the instructions executed by the processing element can include the methods of any one of examples 1-22.

Example 33 may include a signal in a wireless network as shown and described herein.

Example 34 may include a method of communicating in a wireless network as shown and described herein.

Example 35 may include a system for providing wireless communication as shown and described herein. The operations or actions performed by the system can include the methods of any one of examples 1-22.

Example 36 may include a device for providing wireless communication as shown and described herein. The operations or actions performed by the device can include the methods of any one of examples 1-22.

The previously described examples 1-22 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-22.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As described above, one aspect of the present technology may relate to the gathering and use of data available from specific and legitimate sources to allow for interaction with a second device for a data transfer. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provide for secure data transfers occurring between a first device and a second device. The personal information data may further be utilized for identifying an account associated with the user from a service provider for completing a data transfer.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, a user may "opt in" or "opt out" of having information associated with an account of the user stored on a user device and/or shared by the user device. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application. In some instances, the user may be notified upon initiation of a data transfer of the device accessing information associated with the account of the user and/or the sharing of information associated with the account of the user with another device.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. An apparatus comprising one or more processors configured to perform operations for wireless communication, the operations comprising:
   receiving coded data comprising a plurality of data elements, the plurality of data elements comprising coded messages;
   determining, for a coded message of the coded messages and based on a semantic model associated with the one or more processors, a semantic distortion value, the semantic model comprising one or more classifiers configured to identify a desired meaning of a given coded message based on a context of the given coded message;
   determining a difference between the semantic distortion value and a baseline semantic distortion value, wherein determining the difference between the semantic distortion value and the baseline semantic distortion value comprises:
      determining, based on the semantic model, a particular semantic distortion value from a baseline message, the particular semantic distortion value being the baseline semantic distortion value; and
      determining the difference between the semantic distortion value and the particular semantic distortion value determined from the baseline message; and
   generating, when the difference exceeds a threshold value, a security message for transmission, the security message indicating a potential security issue.

2. The apparatus comprising one or more processors of claim 1, wherein the semantic distortion value represents a value of a semantic parameter associated with the coded message, and wherein the baseline semantic distortion value represents an expected value for the semantic parameter associated with the coded message.

3. The apparatus comprising one or more processors of claim 1, wherein the security message comprises a flag indicating the potential security issue, the flag being transmitted with the coded message to a remote device.

4. The apparatus comprising one or more processors of claim 1, wherein the coded message is a first coded message, and wherein determining the difference between the semantic distortion value and the baseline semantic distortion value comprises:
   determining, for a second coded message and based on the semantic model, a second semantic distortion value representing the baseline semantic distortion value;
   determining a difference between the semantic distortion value and the second semantic distortion value; and generating, when the difference exceeds the threshold value, the security message indicating the potential security issue.

5. The apparatus comprising one or more processors of claim 4, wherein the first coded message and the second coded message are received within a predefined time period during which changes to one or more semantic parameters associated with each of the coded messages should deviate less than predefined thresholds for each of the one or more semantic parameters.

6. The apparatus comprising one or more processors of claim 4, wherein the first coded message and the second coded message are received consecutively.

7. The apparatus comprising one or more processors of claim 1, wherein the baseline message is accessed from a local data source.

8. The apparatus comprising one or more processors of claim 7, wherein the baseline message comprises a metadata message for content associated with the coded message.

9. The apparatus comprising one or more processors of claim 1, wherein determining the difference between the semantic distortion value and the baseline semantic distortion value comprises:

generating an augmented semantic message representing an expected semantic message for a receiving device;

determining, based on the semantic model, a specific semantic distortion value for the augmented semantic message, the specific semantic distortion value being the baseline semantic distortion value;

determining a difference between the semantic distortion value and the specific semantic distortion value; and generating, when the difference exceeds the threshold value, the security message indicating the potential security issue.

10. The apparatus comprising one or more processors of claim 1, wherein determining the difference between the semantic distortion value and the baseline semantic distortion value comprises:

accessing, from a local data source, a red flag message associated with a known security issue for the semantic model;

determining, based on the semantic model, a specific semantic distortion value for the red flag message, the specific semantic distortion value being the baseline semantic distortion value;

determining a difference between the semantic distortion value and the specific semantic distortion value; and generating, when the difference is within the threshold value, the security message indicating the potential security issue.

11. A method comprising:

receiving, in a wireless communications session, coded data comprising a plurality of data elements, the data elements comprising a set of first data elements comprising coded messages that are interleaved with a set of second data elements comprising semantic coded messages;

determining, for a coded message of the set of first data elements, a first semantic distortion value, the determining based on a semantic model comprising one or more classifiers configured to identify a desired meaning of a given coded message based on a context of the given coded message;

determining, based on the semantic model, for a semantic coded message of the set of second data elements and that corresponds to the coded message, a second semantic distortion value; and generating, responsive to determining that a difference between the first semantic distortion value and the second semantic distortion value exceeds a threshold value, a security message indicating a potential security issue.

12. The method of claim 11, wherein the semantic model is a local semantic model stored at a local location.

13. The method of claim 11, wherein the first semantic distortion value represents a value for a semantic parameter associated with the coded message, and wherein the second semantic distortion value represents an expected value the semantic parameter associated with the semantic coded message.

14. The method of claim 11, further comprising:

receiving, with the coded data, an interleaving element that specifies an interleaving period in which at least one of the first data elements is interleaved into the set of second data elements.

15. The method of claim 14, wherein the interleaving element specifies a time period or a number of data elements.

16. The method of claim 14, wherein the interleaving period includes at least one first data element that includes first information that is redundant with second information of at least one second data element; or wherein the interleaving period includes at least one first data element that includes first information received instead of second information of at least one second data element.

17. The method of claim 11, further comprising:

receiving, in a tracking message with the coded data, a semantic coherence time parameter that specifies a length of time during which changes to one or more semantic parameters of the set of second data elements should deviate less than a specified threshold value.

18. The method of claim 11, further comprising:

receiving, with the coded data, a semantic coherence time parameter that specifies a length of time during which differences among semantic distortion values should deviate less than the threshold value unless there is the potential security issue.

19. The method of claim 18, wherein the length of time adjusted based on historic data associated with an application, the historic data specifying nominal semantic behavior for the application, anomalous semantic behavior the application, or a combination thereof.

20. The method of claim 11, wherein the security message comprises a request to increase an interleave frequency of the set of first data elements with the set of second data elements.

\* \* \* \* \*